(12) United States Patent
Yoo et al.

(10) Patent No.: US 12,347,873 B2
(45) Date of Patent: Jul. 1, 2025

(54) CATALYST FOR FUEL CELL, FUEL CELL COMPRISING THE SAME AND PREPARATION METHOD OF THE CATALYST FOR FUEL CELL

(71) Applicant: KOREA INSTITUTE OF SCIENCE AND TECHNOLOGY, Seoul (KR)

(72) Inventors: Sung Jong Yoo, Seoul (KR); Myeong-Geun Kim, Seoul (KR); Bora Seo, Seoul (KR); Hee-Young Park, Seoul (KR); So Young Lee, Seoul (KR); Hyun Seo Park, Seoul (KR); Jin Young Kim, Seoul (KR); Hyoung-Juhn Kim, Seoul (KR); Jong Hyun Jang, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 561 days.

(21) Appl. No.: 17/855,068

(22) Filed: Jun. 30, 2022

(65) Prior Publication Data

US 2023/0163317 A1    May 25, 2023

(30) Foreign Application Priority Data

Nov. 19, 2021 (KR) .................. 10-2021-0160734

(51) Int. Cl.
*H01M 4/92* (2006.01)
*H01M 4/90* (2006.01)

(52) U.S. Cl.
CPC ........ *H01M 4/923* (2013.01); *H01M 4/9083* (2013.01)

(58) Field of Classification Search
None
See application file for complete search history.

(56) References Cited

FOREIGN PATENT DOCUMENTS

| | | |
|---|---|---|
| JP | 2008534431 A | 8/2008 |
| JP | 2014218429 A | 11/2014 |
| KR | 100879299 B1 | 1/2009 |
| KR | 101391707 B1 | 5/2014 |
| KR | 102202631 B1 | 1/2021 |

OTHER PUBLICATIONS

Kim et al. Nanotubular Geometry for Stabilizing Metastable 1T-Phase Ru Dichalcogenides; Adv. Energy Mater. 2023, 13, 2203133 (Year: 2023).*

* cited by examiner

*Primary Examiner* — Lucas J. O'Donnell
(74) *Attorney, Agent, or Firm* — NSIP Law

(57) ABSTRACT

The present disclosure relates to a method for preparing a catalyst for a fuel cell, a catalyst for a fuel cell and a fuel cell including the same. More specifically, the catalyst for a fuel cell according to the present disclosure, wherein ruthenium chalcogenide including the 1T phase exists as single-walled nanotubes, can reduce manufacturing cost by exhibiting superior catalytic activity so as to replace the existing platinum catalyst and can significantly improve stability.

12 Claims, 28 Drawing Sheets

CATALYST FOR FUEL CELL, FUEL CELL COMPRISING THE SAME AND PREPARATION METHOD OF THE CATALYST FOR FUEL CELL

CROSS-REFERENCE TO RELATED APPLICATION

This application claims priority to Korean Patent Application No. 10-2021-0160734 filed on Nov. 19, 2021, and all the benefits accruing therefrom under 35 U.S.C. § 119, the contents of which in its entirety are herein incorporated by reference.

BACKGROUND

1. Field

The present disclosure relates to a catalyst for a fuel cell, a fuel cell including the same and a method for preparing the catalyst for a fuel cell.

2. Description of the Related Art

Oxygen reduction reaction (ORR) and hydrogen oxidation reaction (HOR) take place in a fuel cell, and platinum has been mainly used as a catalyst for the two reactions. However, because platinum is rare and expensive, it is necessary to develop other catalysts that can replace it. Although various catalysts have been used as oxygen reduction reaction (ORR) catalysts, few exhibit comparable activity and characteristics to those of platinum. Likewise, there are only a few electrocatalysts exhibiting comparable HOR activity to platinum.

Ruthenium, which is the least expensive among platinum group metals, has been mainly used as a water electrolysis catalyst but shows possibility as hydrogen oxidation reaction catalyst recently. In addition, chalcogenization of a metal using sulfur or selenium is drawing attentions as a method for modifying and/or improving the characteristics of the metal while reducing the use of the metal.

A tube structure not only increase the catalyst utilization, but also provide superior catalytic activities such as material transport characteristics, etc. In tube structure, the dissolution of metal can be suppressed, thereby improving stability. Generally, metal chalcogenide-based nanotubes have diameters ranging from 6 to hundreds of nanometers and are synthesized by rolling in one direction or by template growth. These synthesis methods are limited in further application since they require the preparatory stage such as preparation of layered nanosheets or etching. A carbon nanotube has a very small diameter of about 2 nm and is obtained by growth on a metal catalyst. Until now, the growth of single-walled nanotubes has been reported very rarely except for carbon. Therefore, the development of a catalyst having a tube structure that can be utilized without limitation in further application, which has a small diameter as carbon nanotubes and grows into single-walled nanotubes, is necessary.

REFERENCES OF THE RELATED ART

Patent Documents

Patent document 1. Korean Patent Registration No. 10-2202631.

SUMMARY

The present disclosure is directed to providing a catalyst for a fuel cell, which exhibits superior catalytic activity and stability due to the presence of ruthenium chalcogenide including 1T phase in single-walled tubular structure, a fuel cell including the same and a method for preparing a catalyst for a fuel cell, which allows the growth of ruthenium chalcogenide nanotubes from amorphous particles unlike the nanotubes prepared through rolling or template growth.

In an aspect, the present disclosure provides a catalyst for a fuel cell, which includes: a carbon support; and ruthenium chalcogenide single-walled nanotubes distributed on the carbon support, wherein the ruthenium chalcogenide includes 1T phase, and the chalcogen of the ruthenium chalcogenide is sulfur, selenium or a combination thereof.

In another aspect, the present disclosure provides a fuel cell including the catalyst for a fuel cell.

In another aspect, the present disclosure provides a method for preparing a catalyst for a fuel cell, which includes: (A) preparing a carbon support solution by adding a carbon support to a solvent; (B) preparing a mixture solution by adding a chalcogen, a ruthenium precursor and a surfactant to the carbon support solution; (C) primarily heat-treating the mixture solution in vacuo; and (D) secondarily heat-treating the primarily heat-treated mixture solution under inert gas atmosphere.

The catalyst for a fuel cell according to the present disclosure, wherein ruthenium chalcogenide including 1T phase is present as single-walled nanotubes, can reduce manufacturing cost by exhibiting superior catalytic activity so as to replace the existing platinum catalyst and can significantly improve stability.

In addition, the method for preparing a catalyst for a fuel cell according to the present disclosure allows growth of ruthenium chalcogenide nanotubes from amorphous particles without nanosheet preparation or etching steps.

BRIEF DESCRIPTION OF THE DRAWINGS

(FIG. 7A), 220° C. (FIG. 7B), 240° C. (FIG. 7C) and 280° C. (FIG. 7D) during preparation of a catalyst for a fuel cell of Example 4 according to the present disclosure and X-ray diffraction (XRD) spectra (FIG. 7E) and X-ray photoelectron spectroscopy (XPS) spectra (FIG. 7F).

DETAILED DESCRIPTION

Figure 1:
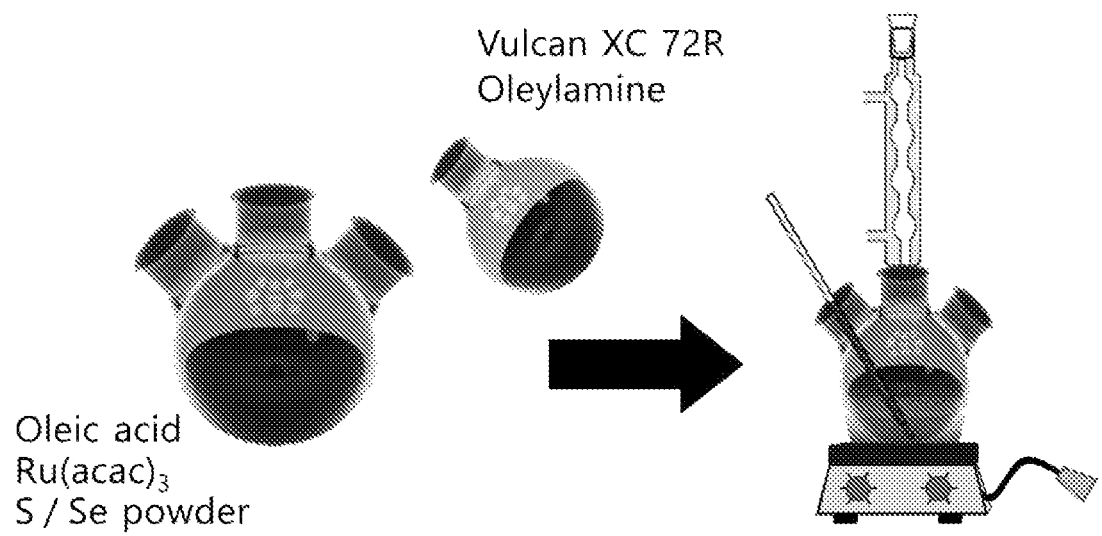
FIG. 1 schematically shows a process of preparing a catalyst for a fuel cell according to the present disclosure.

Hereinafter, the present disclosure will be described more specifically referring to the attached drawings and examples.

In the present specification, a "ruthenium chalcogenide" refers to a compound consisting of ruthenium and a group 16 chalcogen element.

In the present specification, a "ruthenium chalcogenide nanotube" refers to a material wherein a ruthenium chalcogenide is bonded to another ruthenium chalcogenide to form a tube (cylindrical) structure having a nanometer-sized diameter.

The present disclosure provides a catalyst for a fuel cell, which includes: a carbon support; and ruthenium chalcogenide single-walled nanotubes distributed on the carbon support, wherein the ruthenium chalcogenide includes 1T phase, and the chalcogen of the ruthenium chalcogenide is sulfur, selenium or a combination thereof.

The catalyst for a fuel cell according to the present disclosure, wherein ruthenium chalcogenide single-walled nanotubes including 1T phase are introduced, may exhibit superior catalytic activity and significantly improved durability owing to the structural characteristics and metastable phase (1T phase) characteristics of the ruthenium chalcogenide single-walled nanotubes.

The catalyst for a fuel cell of the present disclosure includes ruthenium chalcogenide single-walled nanotubes. The ruthenium chalcogenide may prevent dissolution and aggregation of the catalyst owing to the single-walled nanotube structure and may significantly improve the utility of the catalyst by improving electrical conductivity and material transfer efficiency. The single-walled nanotube structure of the ruthenium chalcogenide may be identified through the diameter (outer diameter) of the ruthenium chalcogenide nanotubes. When considering the interplanar distance of ruthenium chalcogenide, the ruthenium chalcogenide nanotubes should have a diameter of at least 6.0 nm in order to exist as multi-walled carbon nanotubes. In general, multi-walled nanotubes are formed as nanosheets are rolled only when the diameter is 6.0 nm or larger, and nanotubes are not formed when the diameter is smaller than 6.0 nm as the nanosheets become stable. However, since the ruthenium chalcogenide single-walled nanotubes of the present disclosure are grown from particles, the ruthenium chalcogenide may form single-walled nanotube structures with a very small diameter. More specifically, the ruthenium chalcogenide single-walled nanotubes may have an average diameter of 1.4-1.6 nm, and the 1T phase may be further stabilized by surface strain when the above range is satisfied.

In addition, the ruthenium chalcogenide includes 1T phase. It can have high conductivity (metallicity) and enough active sites when it includes the 1T phase. The inclusion of the 1T phase in the ruthenium chalcogenide may be identified through transmission electron microscopy (TEM) images. More specifically, it may be identified by comparing the TEM images of the ruthenium chalcogenide with the molecular structure modeling of the 1T phase.

In addition, the ruthenium chalcogenide may further include 2H phase in addition to the 1T phase. Specifically, it may include more 1T phase than the 2H phase. The crystal structure of the ruthenium chalcogenide may be identified by X-ray photoelectron spectroscopy (XPS). The ruthenium chalcogenide may exhibit peaks at 0-2 eV as a result of X-ray photoelectron spectroscopy (XPS) analysis when the 1T phase is dominant giving it rise to the metallicity what is called the Fermi edge cutoff phenomenon (abrupt increase in intensity near 0 eV).

In addition, as a result of X-ray photoelectron spectroscopy (XPS) analysis, the ruthenium chalcogenide exhibits a peak related with the 1T phase at a lower binding energy region and exhibits a peak related with the 2H phase at a higher binding energy region. When the 1T phase is dominant, the ruthenium chalcogenide may exhibit, as a result of S 2p and Se 3d X-ray photoelectron spectroscopy (XPS) analysis, a ratio of the area of a peak at 163.5-164.2 eV to the area of a peak at 162.4-163.5 eV of 0.5-2.5, specifically 1-2.3, most specifically 1.5-2. Alternatively, as a result of Se 3d X-ray photoelectron spectroscopy (XPS) analysis, it may exhibit a ratio of the area of a peak at 55.7-56.9 eV to the area of a peak at 54.4-55.2 eV of 2.5-10, specifically 3-9.5, most specifically 5-9.3. When the XPS analysis result satisfies the above conditions, significantly improved conductivity may be exhibited as the 1T phase is more abundant.

The chalcogen of the ruthenium chalcogenide may be sulfur, selenium or a combination thereof. When the chalcogen is a mixture of sulfur and selenium, the sulfur may be included in an amount of 0.1-0.98 mol %, specifically 0.4-0.95 mol %, more specifically 0.45-0.9 mol %, most specifically 0.65-0.85 mol %, based on 100 mol % of the chalcogen. In particular, when the sulfur is included in an amount of 0.65-0.85 mol %, the ruthenium chalcogenide has significantly improved stability owing to formation of many anion vacancies.

The ruthenium chalcogenide may contain anion vacancies. In general, because the 1T phase is metastable, it tends to change into a stable phase upon exposure to air and heat or over time and the characteristics of the 1T phase are not retained. However, if anion vacancies are contained, the characteristics of the 1T phase may be retained for a long period of time. The presence of anion vacancies may be identified by electron paramagnetic resonance (EPR) and energy-dispersive spectroscopy (EDS). When the ruthenium chalcogenide contains anion vacancies, it may exhibit a peak at g=2.003 as a result of electron paramagnetic resonance (EPR) analysis. In addition, as a result of elemental composition analysis by energy-dispersive spectroscopy (EDS), the ruthenium chalcogenide containing anion vacancies may exhibit a chalcogen-to-ruthenium ratio (chalcogen/ruthenium) of lower than 2, specifically lower than 1.9, more specifically lower than 1.6. Although the lower limit is not specifically limited, it may be 1.2 or higher because transition to another phase or collapse of the tube structure may occur when it is lower than 1.2. In particular, it was confirmed that significantly improved stability is achieved when the chalcogen-to-ruthenium ratio is lower than 1.6 as the characteristics of the 1T phase are retained for 100 days or longer.

In an exemplary embodiment of the present disclosure, the ruthenium chalcogenide nanotubes may be grown from amorphous particles and may exhibit the strongest intensity for a peak corresponding to the (002) plane as compared to the peaks corresponding to the (110), (103) and (105) planes as a result of XRD analysis. The ruthenium chalcogenide nanotubes of the present disclosure may have high electron transport and material transfer characteristics as they grow from amorphous particles along the direction of the (002) plane and may exhibit superior structural stability.

The carbon support may be one or more selected from a group consisting of Vulcan, graphite carbon, acetylene black, Ketjen black, carbon nanotube, carbon nanowire and carbon nanorod.

In addition, the present disclosure provides a fuel cell including the catalyst for a fuel cell.

As described above, the existing transition metal chalcogenides are limited in that, because they are prepared by rolling of nanosheets in one direction or by template growth, the synthesis procedure is complicated and the procedure of nanosheet preparation or etching is necessary.

Therefore, the present disclosure provides a method for preparing a catalyst for a fuel cell having high electron transport and material transfer characteristics and high durability due to significantly improved structural stability by growing ruthenium chalcogenide nanotubes from amorphous particles.

The present disclosure provides a method for preparing a catalyst for a fuel cell, which includes: (A) preparing a carbon support solution by adding a carbon support to a solvent; (B) preparing a mixture solution by adding a chalcogen, a ruthenium precursor and a surfactant to the carbon support solution; (C) primarily heat-treating the mixture solution in vacuo; and (D) secondarily heat-treating the primarily heat-treated mixture solution under inert gas atmosphere.

In an exemplary embodiment of the present disclosure, the method may further include, after the step (D), (E) obtaining a catalyst in powder form from the mixture solution obtained in the step (D).

Hereinafter, each step of the method for preparing a catalyst for a fuel cell of the present disclosure will be described more specifically.

(A) Preparation of Carbon Support Solution by Adding Carbon Support to Solvent

In the step (A), a carbon support is dispersed in a solvent. Sonication may be conducted for more uniform dispersion.

The carbon support may be one or more selected from a group consisting of Vulcan, graphite carbon, acetylene black, Ketjen black, carbon nanotube, carbon nanowire and carbon nanorod.

The solvent may be one or more selected from a group consisting of oleylamine, tetradecylamine and hexadecylamine.

(B) Preparation of Mixture Solution by Adding Chalcogen, Ruthenium Precursor and Surfactant to Carbon Support Solution In the step (B), a precursor forming ruthenium chalcogenide nanotubes is added to the carbon support solution.

The chalcogen may be sulfur, selenium or a combination thereof. The chalcogen may be a mixture of sulfur and selenium, and the sulfur may be included in an amount of 0.1-0.98 mol %, specifically 0.4-0.95 mol %, more specifically 0.45-0.9 mol %, most specifically 0.65-0.85 mol %, based on 100 mol % of the chalcogen. In particular, when the sulfur is included in an amount of 0.65-0.85 mol %, the ruthenium chalcogenide formed during the preparation of the mixture solution has significantly improved stability owing to formation of many anion vacancies.

The ruthenium precursor may be one or more selected from a group consisting of ruthenium(III) 2,4-pentanedionate, ruthenium(III) acetylacetonate, ruthenium(III) acetate and ruthenium(III) chloride.

The surfactant serves to control the dispersion and morphology of particles and may be one or more selected from a group consisting of oleic acid, hexadecanethiol and triethylphosphine.

In the step (B), the ruthenium precursor and the chalcogen may be added at a molar ratio of 1:1-1:3, specifically 1:1.5-2.5. If the molar ratio of the ruthenium precursor and the chalcogen is lower than 1:1, it may be difficult for the ruthenium chalcogenide to grow into single-walled nanotubes since most of the ruthenium precursor is consumed for formation of ruthenium particles. On the contrary, if the molar ratio exceeds 1:3, the ruthenium chalcogenide may grow into nanosheets rather than nanotubes.

(C) Primary Heat Treatment of Mixture Solution in Vacuo

In the step (C), the mixture solution is primarily heat-treated to remove water and oxygen remaining in the mixture solution. It may be performed in vacuo at 60-110° C., specifically at 70-90° C., for 10-90 minutes, specifically 20-60 minutes. If the temperature and time are below the lower limits, the catalyst for a fuel cell may be oxidized due to the remaining water and oxygen. And, if they exceed the upper limits, unexpected reactions may occur due to unintended nucleation of ruthenium.

(D) Secondary Heat Treatment of Primarily Heat-Treated Mixture Solution Under Inert Gas Atmosphere In the step (D), ruthenium chalcogenide nanotubes are grown by secondarily heat-treating the primarily heat-treated mixture solution under inert gas atmosphere. It may be performed by increasing temperature to 260-320° C., specifically to 270-300° C., and maintaining the temperature for 10-90 minutes, specifically for 20-60 minutes. If any of the time and temperature is below the lower limit, ruthenium chalcogenide nanorods may not sufficiently grow and crystallize into nanotubes. And, if they exceed the upper limits, nanosheets may be formed together with nanotubes.

The inert gas may be one or more selected from a group consisting of argon, helium, neon, xenon and krypton.

(E) Obtainment of Catalyst in Powder Form by Cooling Mixture Solution Obtained in (D) to Room Temperature and then Washing and Drying Same The washing may be performed using one or more selected from a group consisting of ethanol, acetone and isopropyl alcohol.

The drying may be performed at 15-35° C.

Although it was not described explicitly in the following examples and comparative examples, the catalysts for a fuel cell were prepared by varying the conditions of the method for preparing a catalyst for a fuel cell of the present disclosure and they were observed by transmission and scanning transmission electron microscopy (TEM/STEM).

As a result, the morphology of ruthenium chalcogenide single-walled nanotubes was maintained even after accelerated degradation testing for 10,000 cycles when all of the following conditions were satisfied and no loss of ruthenium occurred.

(1) The carbon support is Vulcan.
(2) The solvent is oleylamine.
(3) The chalcogen is a mixture of sulfur and selenium, and the sulfur is included in an amount of 0.65-0.85 mol % based on 100 mol % of the chalcogen.
(4) The ruthenium precursor is ruthenium(III) 2,4-pentanedionate.
(5) The surfactant is oleic acid.
(6) In the step (B), the ruthenium precursor and the chalcogen are added at a molar ratio of 1:1.5-2.5.
(7) The step (C) is performed in vacuo at 70-90° C. for 20-60 minutes.
(8) The step (D) is performed by increasing temperature to 270-300° C. temperature and maintaining the temperature for 20-60 minutes.

When any of the above conditions was not satisfied, phase transition occurred easily from the 1T phase to the stable 2H phase or cubic phase even after short exposure to air and activity was decreased rapidly. In addition, the morphology of ruthenium chalcogenide single-walled nanotubes collapsed after 10,000 cycles of accelerated degradation testing, and the activity of oxygen reduction reaction and hydrogen oxidation reaction was very low.

Hereinafter, the present disclosure is described more specifically through examples. However, the examples are provided only to help the understanding of the present disclosure and the scope of the present disclosure is not limited by the examples.

Example 1. $RuSe_2$ (1) Materials

Ruthenium(III) 2,4-pentanedionate (Ru 24% min, $C_{15}H_{21}O_6Ru$, Alfa Aesar), sulfur (S, Sigma-Aldrich) and selenium (Se, 99+%, Sigma-Aldrich) were used as precursors for hydrothermal synthesis, oleylamine (70%, Sigma-Aldrich) and oleic acid (90%, Sigma-Aldrich) were used as a solvent and a surfactant, respectively, and Vulcan XC 72R was used as a carbon support.

(2) Preparation Process

FIG. 1 schematically shows a process of preparing a catalyst for a fuel cell according to the present disclosure. The preparation process of Example 1 will be described referring to the figure.

After adding 30 mg of the carbon support to 10 mL of oleylamine, a carbon support solution was prepared by sonicating for about 30 minutes. Then, after adding the carbon support solution, 0.2 mmol of the ruthenium precursor and 0.4 mmol of the chalcogen powder to a three-neck flask, a mixture solution was prepared by further adding 10 mL of an oleic acid solution. Then, after removing water and oxygen from the mixture solution at 80° C. for 30 minutes in vacuo, argon gas was filled. Then, after increasing temperature to 280° C. with mild stirring, reaction was conducted by maintaining the temperature for 30 minutes. After the reaction was completed, the temperature was lowered to room temperature and the sample was recovered using a centrifuge. After washing the recovered sample with ethanol for 3 or more times through centrifugation, a final catalyst was obtained in powder form by drying at room temperature.

The chalcogen powder used in Example 1 included selenium only.

Example 2. $Ru(S_{0.2}Se_{0.8})_2$

A catalyst was prepared in the same manner as in Example 1 except that a mixture of 50 mol % of sulfur and 50 mol % of selenium was used as the chalcogen powder. The catalyst for a fuel cell prepared in Example 2 had a molar ratio of sulfur and selenium of 1:4.

Example 3. $Ru(S_{0.5}Se_{0.5})_2$

A catalyst was prepared in the same manner as in Example 1 except that a mixture of 63 mol % of sulfur and 37 mol % of selenium was used as the chalcogen powder. The catalyst for a fuel cell prepared in Example 3 had a molar ratio of sulfur and selenium of 1:1.

Example 4. $Ru(S_{0.8}Se_{0.2})_2$

A catalyst was prepared in the same manner as in Example 1 except that a mixture of 75 mol % of sulfur and 25 mol % of selenium was used as the chalcogen powder. The catalyst for a fuel cell prepared in Example 4 had a molar ratio of sulfur and selenium of 4:1.

Example 5. $RuS_2$

A catalyst was prepared in the same manner as in Example 1 except that the chalcogen powder included sulfur only.

Comparative Example 1. Ru/C

Ru/C powder supported on Vulcan was purchased from Premetek.

Test Example 1. Morphological Analysis of Catalysts for a Fuel Cell

The transmission and scanning transmission electron microscopy (TEM/STEM) images of the catalysts for a fuel cell prepared in Examples 1-5 were obtained using FEI Titan™ 80-300 and energy-dispersive spectroscopy (EDS) analysis was conducted using Talos F200X. The results are shown in FIGS. 2A to 2F and FIGS. 3A to 3H.

Figure 2A:
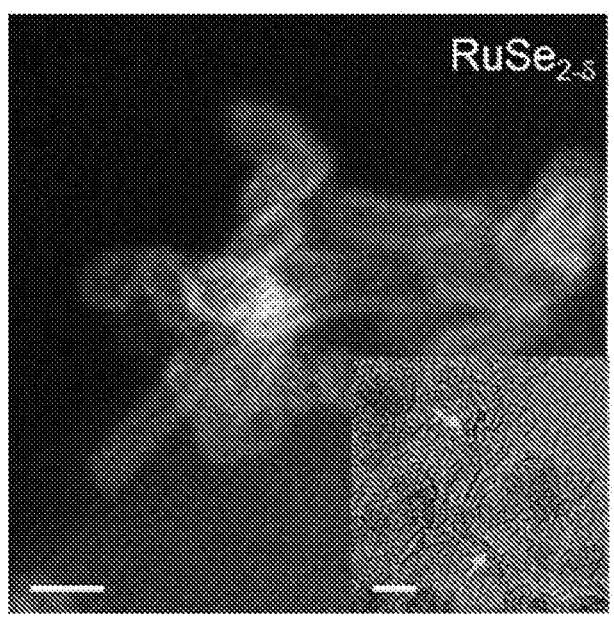
FIGS. 2A to 2F show the transmission/scanning transmission electron microscopy (TEM/STEM) images of catalysts for a fuel cell prepared in Example 1 (FIG. 2A), Example 2 (FIG. 2B), Example 3 (FIG. 2C), Example 4 (FIG. 2D) and Example 5 (FIG. 2E) according to the present disclosure and elemental compositions thereof (FIG. 2F).
Figure 2B:
Figure 2C:
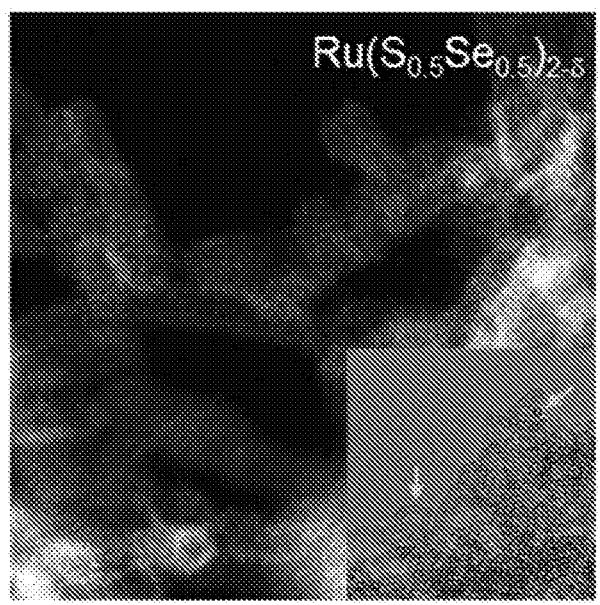
Figure 2D:
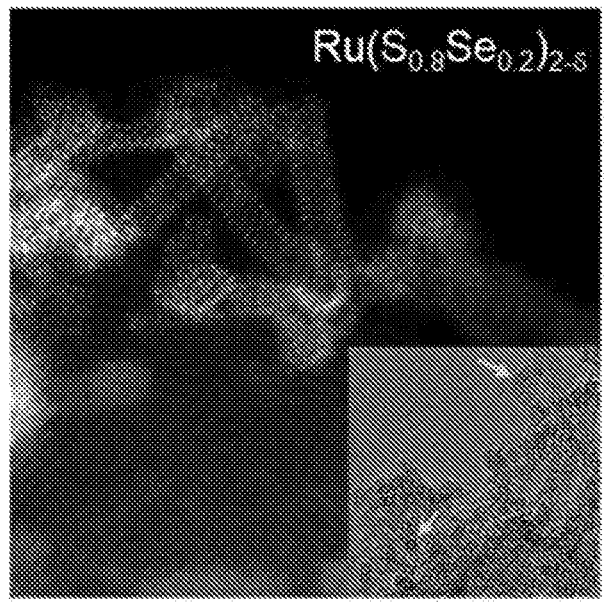
Figure 2E:
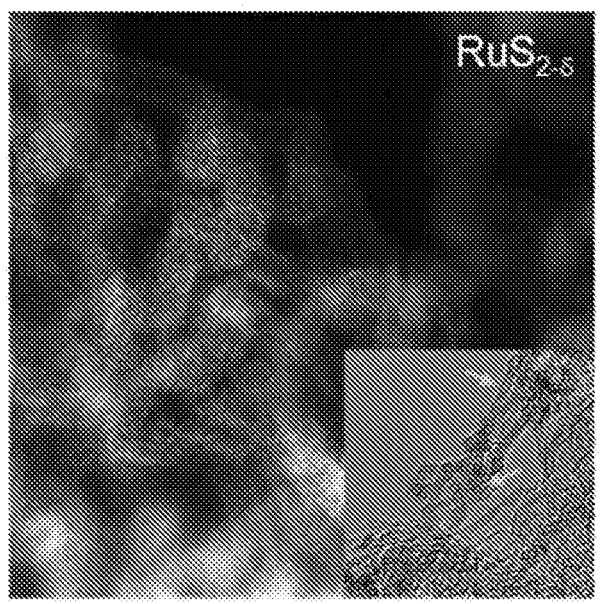
Figure 2F:
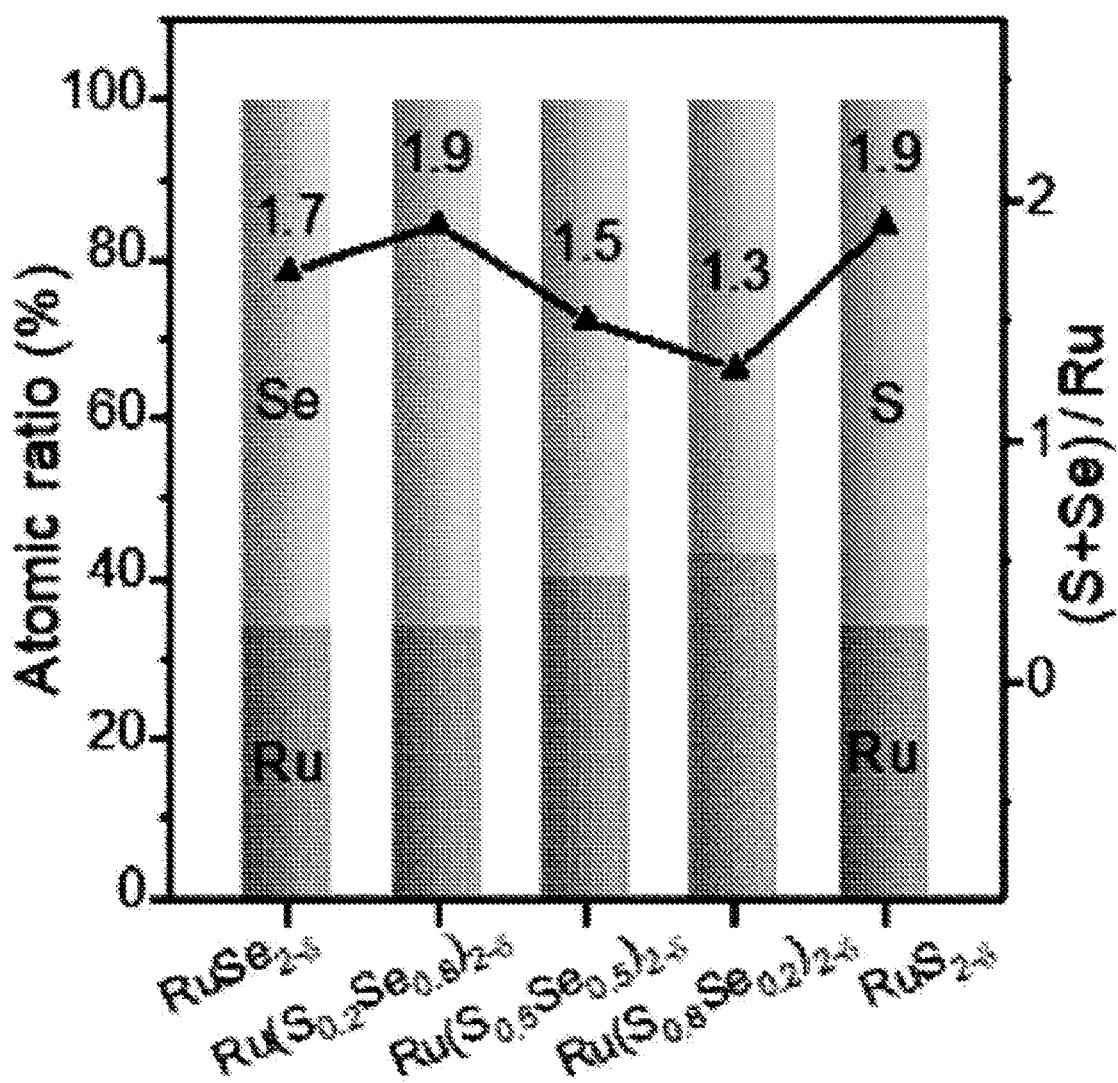
Figure 3A:
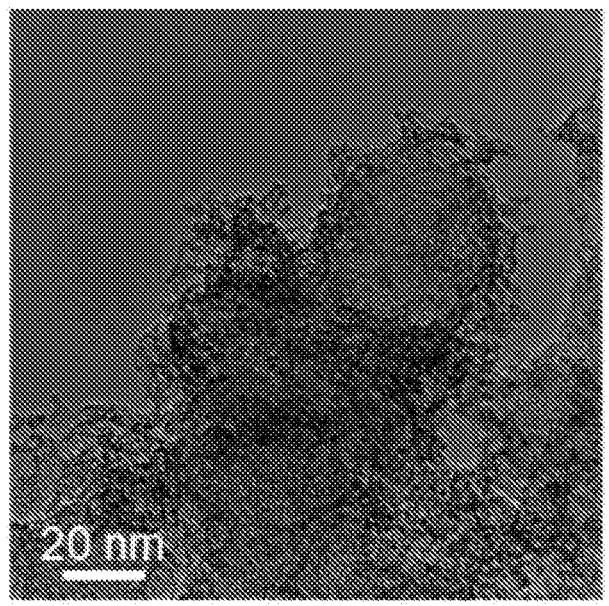
FIGS. 3A to 3D show transmission electron microscopy (TEM) images and FIGS. 3E to 3H show energy-dispersive spectroscopy (EDS) mapping images of a catalyst for a fuel cell prepared in Example 4 according to the present disclosure.
Figure 3B:
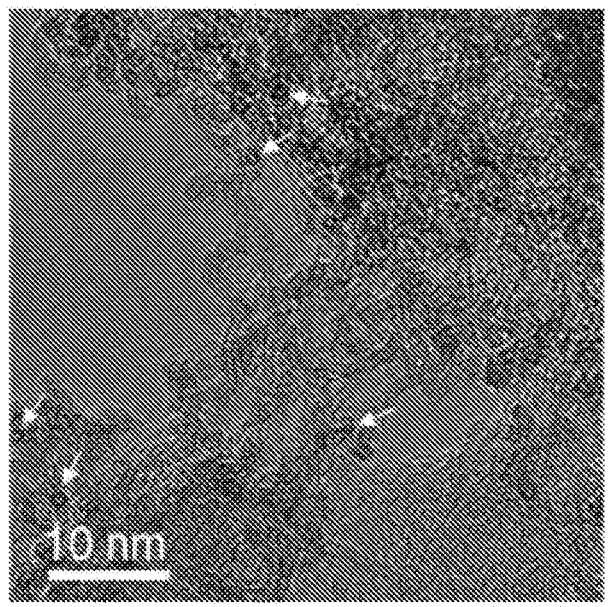
Figure 3C:
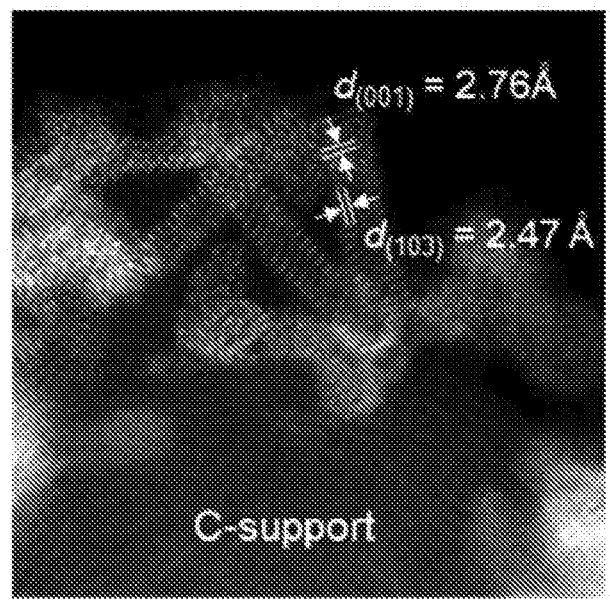
Figure 3D:
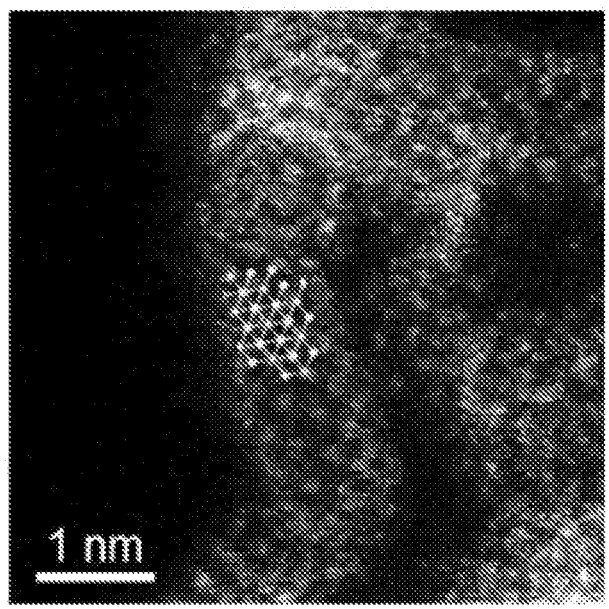
Figure 3E:
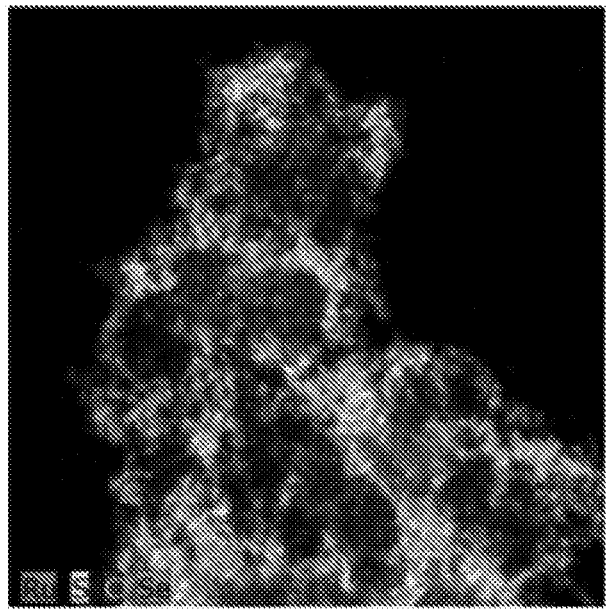
Figure 3F:
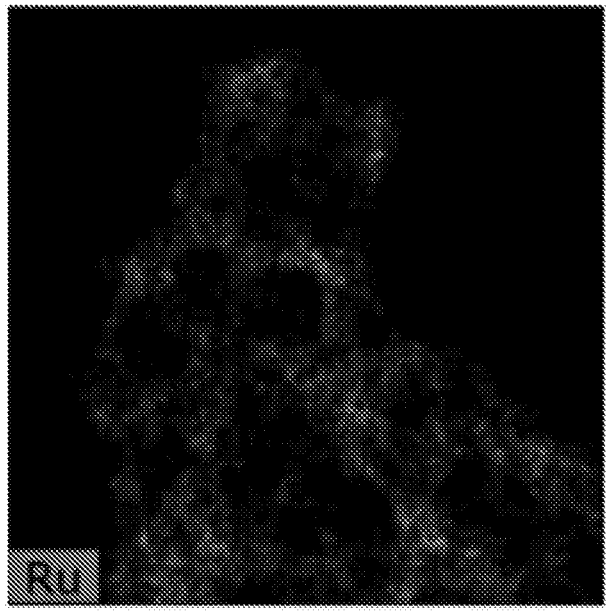
Figure 3G:
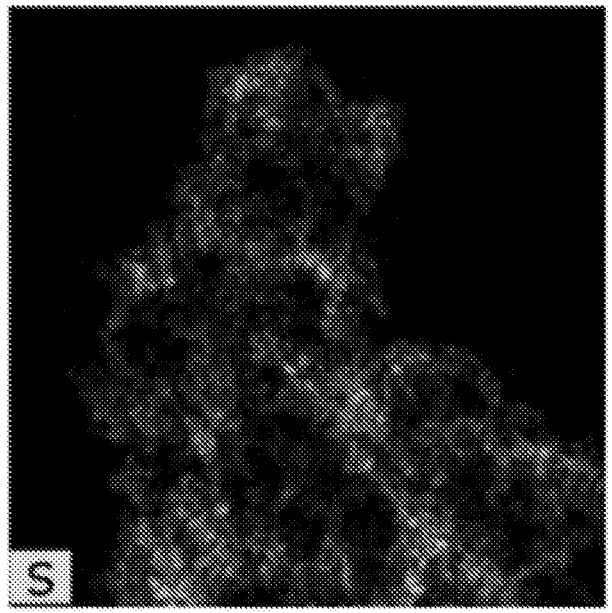
Figure 3H:
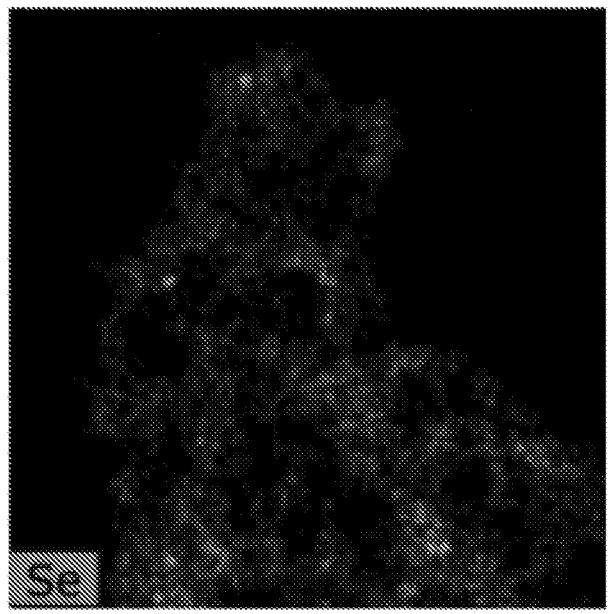

FIGS. 2A to 2F show the transmission/scanning transmission electron microscopy (TEM/STEM) images of the catalysts for a fuel cell prepared in Example 1 (FIG. 2A), Example 2 (FIG. 2B), Example 3 (FIG. 2C), Example 4 (FIG. 2D) and Example 5 (FIG. 2E) according to the present disclosure and the elemental compositions thereof (FIG. 2F). Referring to FIGS. 2A to 2E, the ruthenium chalcogenide of all the catalysts for a fuel cell of Examples 1-5 had a single-walled nanotube structure. In addition, referring to FIG. 2F, the proportion of anions (sulfur or selenium) to ruthenium was lower than 2 as 1.7, 1.9, 1.5, 1.3 and 1.9, respectively, for Examples 1-5, suggesting that anion vacancies are present.

The diameter and wall thickness of ruthenium chalcogenide nanotubes in the catalysts for a fuel cell prepared in Examples 1-5 are described in Table 1.

TABLE 1

|  | Outer diameter (nm) | Wall thickness (nm) |
|---|---|---|
| Example 1 | 1.6 | 0.4 |
| Example 2 | 1.5 | 0.3 |
| Example 3 | 1.5 | 0.3 |
| Example 4 | 1.5 | 0.3 |
| Example 5 | 1.5 | 0.3 |

FIGS. 3A to 3D show transmission electron microscopy (TEM) images and FIGS. 3E to 3H show energy-dispersive spectroscopy (EDS) mapping images of the catalyst for a fuel cell prepared in Example 4 according to the present disclosure.

Ruthenium chalcogenide is known to be stable as a cubic phase at room temperature and metastable hexagonal phases include the semiconducting 2H phase and the metallic 1T phase. From the interatomic spacing and arrangement of ruthenium chalcogenide shown in FIGS. 3A to 3H, it can be seen that the ruthenium chalcogenide nanotubes in the catalyst for a fuel cell prepared in Example 4 have the metastable 1T phase exhibiting metallicity.

In addition, from the EDS mapping images of FIGS. 3E to 3H, it can be seen that all the ruthenium, sulfur and selenium elements are uniformly distributed on the carbon support, indicating that the ruthenium chalcogenide nanotubes were synthesized and distributed uniformly on the carbon support.

Test Example 2. XRD and XPS Analysis

The catalysts for a fuel cell prepared in Examples 1-5 were analyzed by X-ray diffraction using the Pohang Accelerator Laboratory 9B beamline at room temperature in a range of 2 theta=10-70° and by X-ray absorption spectroscopy using the Pohang Accelerator Laboratory 8C beamline. The results are shown in FIGS. 4A to 4C.

Figure 4A:
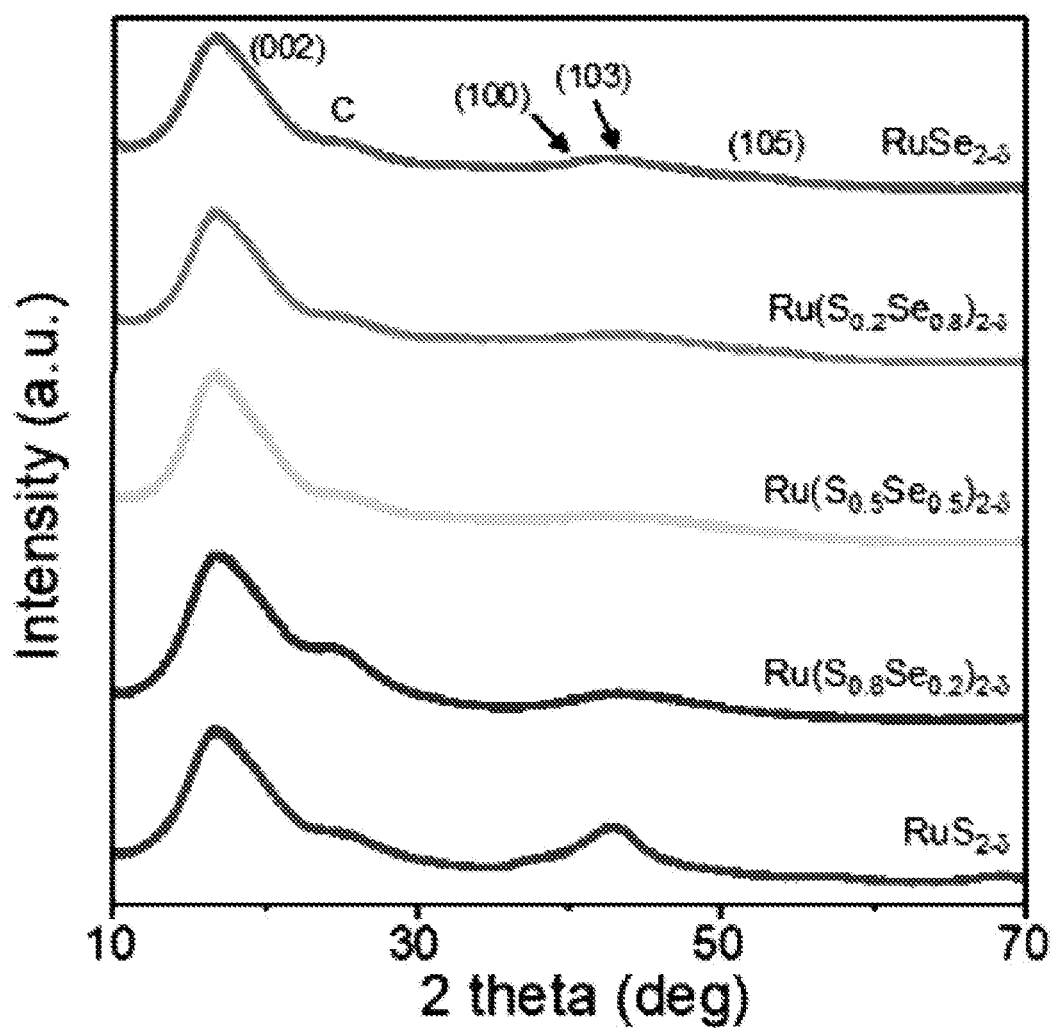
FIGS. 4A to 4C show X-ray diffraction (XRD) spectra (FIG. 4A), X-ray absorption near edge structure (XANES) spectra (FIG. 4B) and extended X-ray absorption fine structure (EXAFS) spectra (FIG. 4C) of catalysts for a fuel cell prepared in Examples 1-5 according to the present disclosure.
Figure 4B:
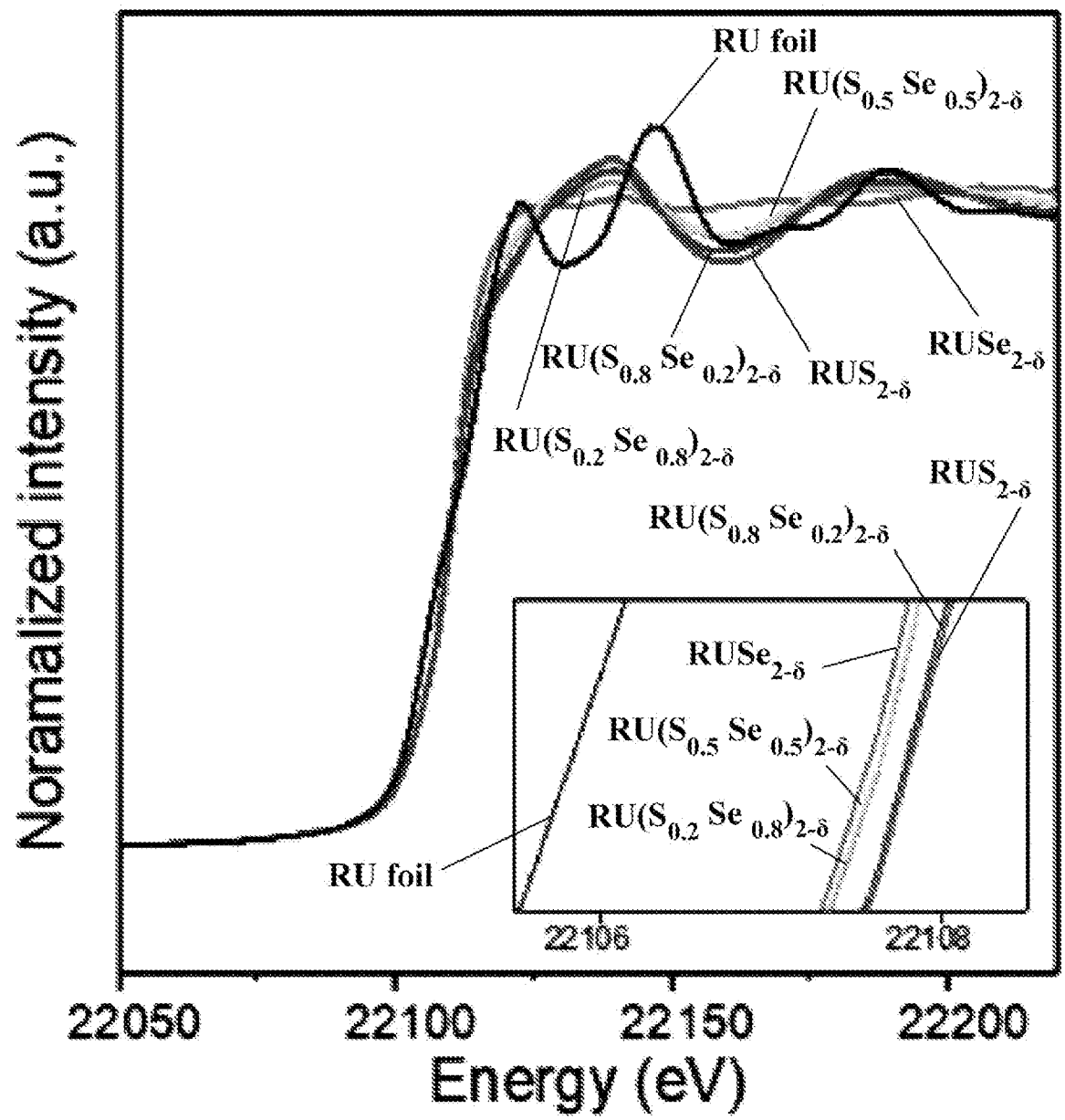
Figure 4C:
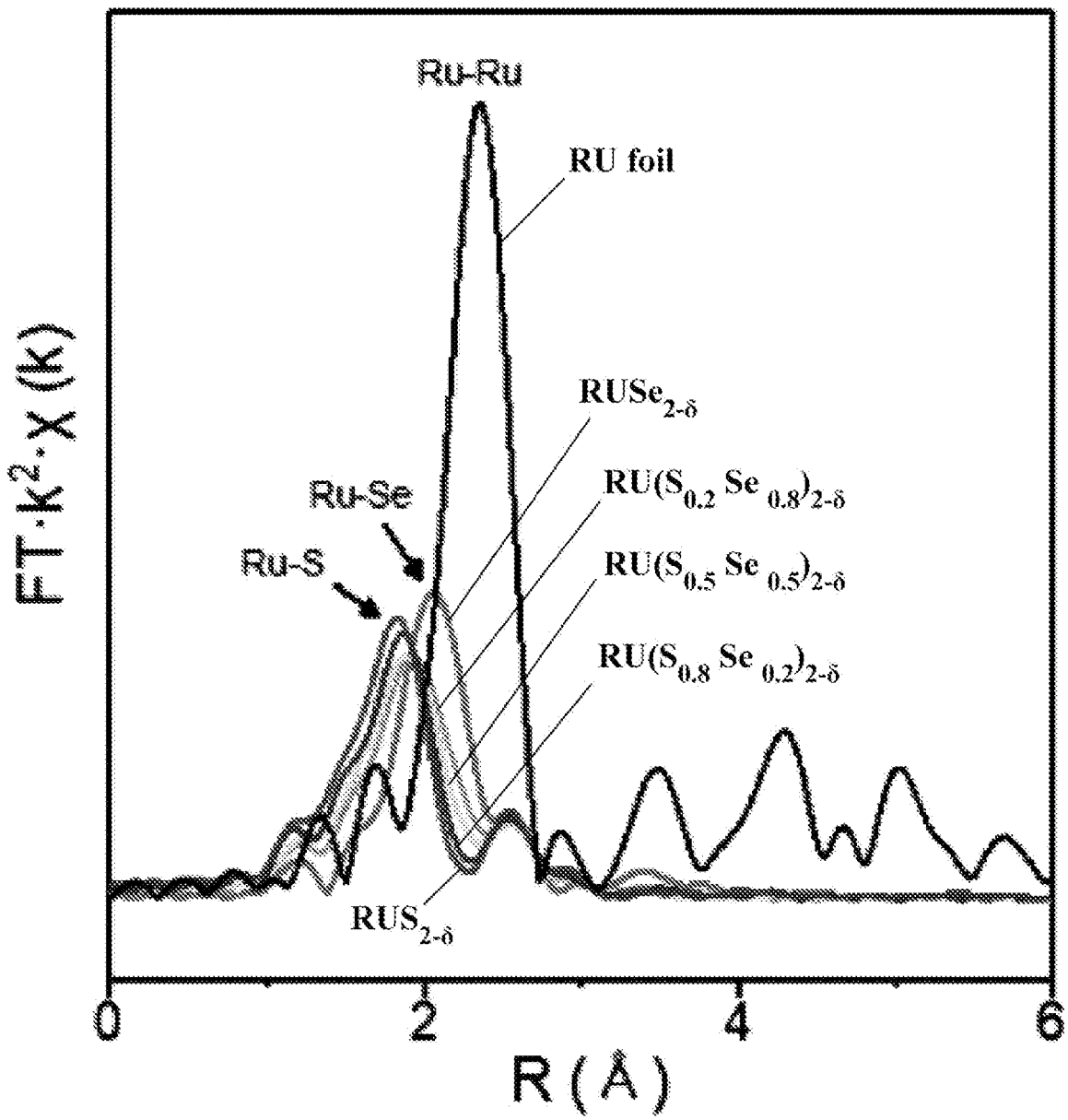

FIGS. 4A to 4C show X-ray diffraction (XRD) spectra (FIG. 4A), X-ray absorption near edge structure (XANES) spectra (FIG. 4B) and extended X-ray absorption fine structure (EXAFS) spectra (FIG. 4C) of the catalysts for a fuel cell prepared in Examples 1-5 according to the present disclosure.

Referring to FIG. 4A, it can be seen that all the catalysts for a fuel cell prepared in Examples 1-5 showed peaks similar to that of molybdenum disulfide (PDF #73-1508) regardless of the composition of sulfur and selenium, indicating that they have hexagonal phases. In addition, the peaks corresponding to the (002) plane showed very strong relative intensity, suggesting that the nanotubes grew along the direction of the (002) plane. No distinct peak shift was observed depending on the change in composition, which was due to the small difference in the size of sulfur (180 pm) and selenium (190 pm).

Referring to the Ru K-edge X-ray absorption near edge structure (XANES) spectra shown in FIG. 4B, all the catalysts for a fuel cell prepared in Examples 1-5 had higher oxidation numbers than ruthenium foil and the oxidation number was increased as the composition of sulfur having higher electronegativity than selenium was increased.

Referring to the extended X-ray absorption fine structure (EXAFS) spectra shown in FIG. 4C, the bond length of ruthenium chalcogenides of Examples 2-4 wherein sulfur and selenium are mixed at specific molar ratios was between the Ru—S bond length and the Ru—Se bond length. Through this, it can be seen that ruthenium, sulfur and selenium are mixed well at atomic level.

Figure 5:
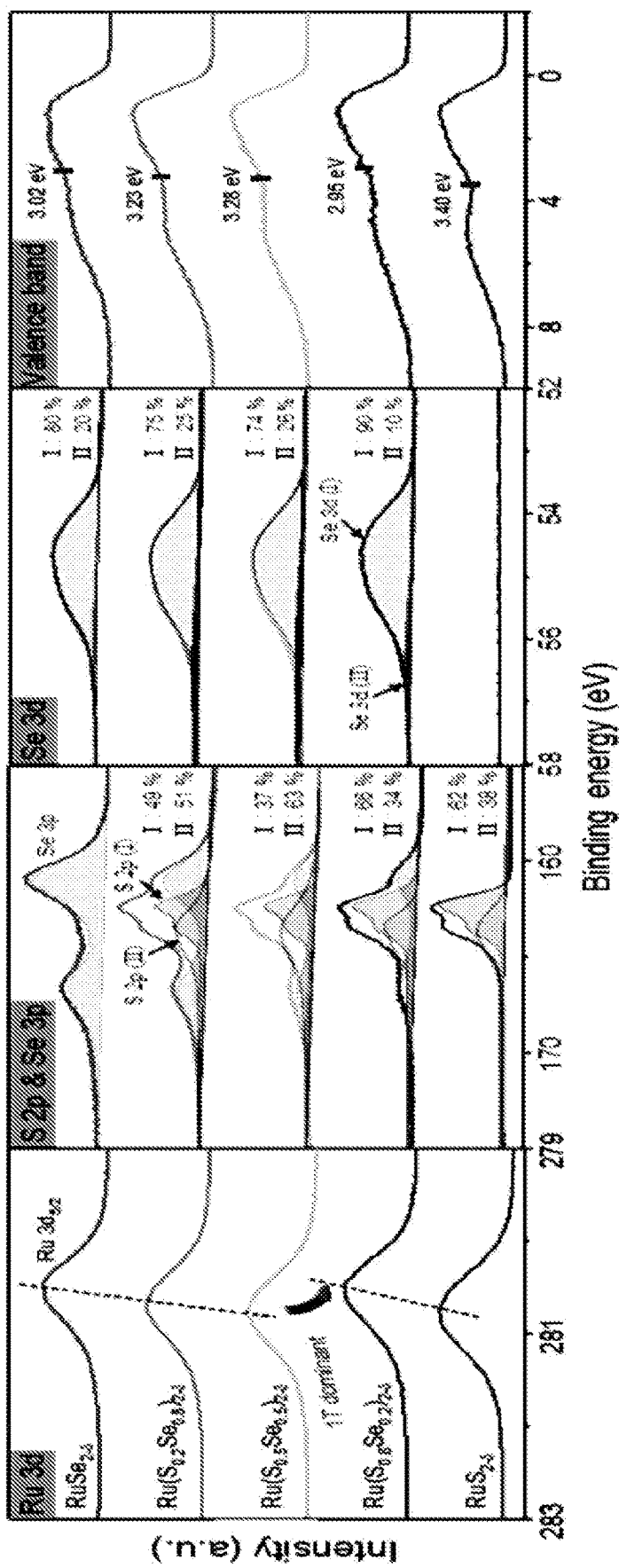
FIG. 5 shows the X-ray photoelectron spectroscopy (XPS) spectra of catalysts for a fuel cell prepared in Examples 1-5 according to the present disclosure.

The catalysts for a fuel cell prepared in Examples 1-5 were analyzed by X-ray photoelectron spectroscopy (XPS) using the Pohang Accelerator Laboratory 8A1 beamline. The result is shown in FIG. 5 and Table 2. In FIG. 5 and Table 2, peaks related with the 1T phase were observed in the lower binding energy region (I), and peaks related with the 2H phase were observed in the higher binding energy region (II).

FIG. 5 shows the X-ray photoelectron spectroscopy (XPS) spectra of the catalysts for a fuel cell prepared in Examples 1-5 according to the present disclosure. In general, peaks are shifted depending on the composition of sulfur and selenium due to the difference in the electronegativity of sulfur and selenium. Referring to FIG. 5, it can be seen that the ruthenium 3d binding energy is increased as the content of sulfur having high electronegativity is increased. However, the sulfur-rich Example 4 $(Ru(S_{0.8}Se_{0.2})_{2-d})$ shows a deviating tendency and has a low binding energy. It may be because the 1T phase having a lower binding energy is remarkably more abundant than the 2H (semiconducting) phase. The sulfur 2p and selenium 3p peaks of Example 4 $(Ru(S_{0.8}Se_{0.2})_{2-d})$ were also stronger in the lower energy regions, indicating that the 1T phase is the most abundant.

Table 2 shows the peak area ratio of the catalysts for a fuel cell prepared in Examples 1-5 according to the present disclosure as a result of X-ray photoelectron spectroscopy (XPS) analysis.

TABLE 2

|  | S 2p & Se 3p | | Se 3d | |
|---|---|---|---|---|
|  | I 162.4-163.5 eV | II 163.5-164.2 eV | I 54.4-55.2 eV | II 55.7-56.9 eV |
| Example 1 | — | — | 80% | 20% |
| Example 2 | 49% | 51% | 75% | 25% |
| Example 3 | 37% | 63% | 74% | 26% |
| Example 4 | 66% | 34% | 90% | 10% |
| Example 5 | 62% | 38% | — | — |

In addition, referring to the spectra in the valence band regions in FIG. 5, it can be seen that all of Examples 1-5 show the Fermi edge cutoff phenomena (abrupt increase in intensity near 0 eV), indicating that they exhibit metallicity. The d-band center can be used as an indicator of the binding to reaction intermediates. A lower d-band center means stronger binding to the intermediate. Example 4 (Ru $(S_{0.8}Se_{0.2})_{2-d})$ had the lowest d-band center, which may be because the 1T phase having a low d-band center value is abundant. Among Examples 1-5, Example 1 $(RuSe_2)$ and Example 4 $(Ru(S_{0.8}Se_{0.2})_{2-d})$ showed d-band center values of 3.1 eV or lower. As can be confirmed later in Test Example 5, where only Example 1 and Example 4 showed activity for oxygen reduction reaction (ORR) and hydrogen oxidation reaction (HRR) at the same time, it can be expected that strong binding to the intermediates is necessary for bi-functionality.

Test Example 3. Electron Paramagnetic Resonance (EPR) Analysis

The catalysts for a fuel cell prepared in Examples 1-5 were analyzed by electron paramagnetic resonance (EPR)

analysis in order to investigate the formation of anion vacancies in ruthenium chalcogenide. The result is shown in FIG. 6.

Figure 6:
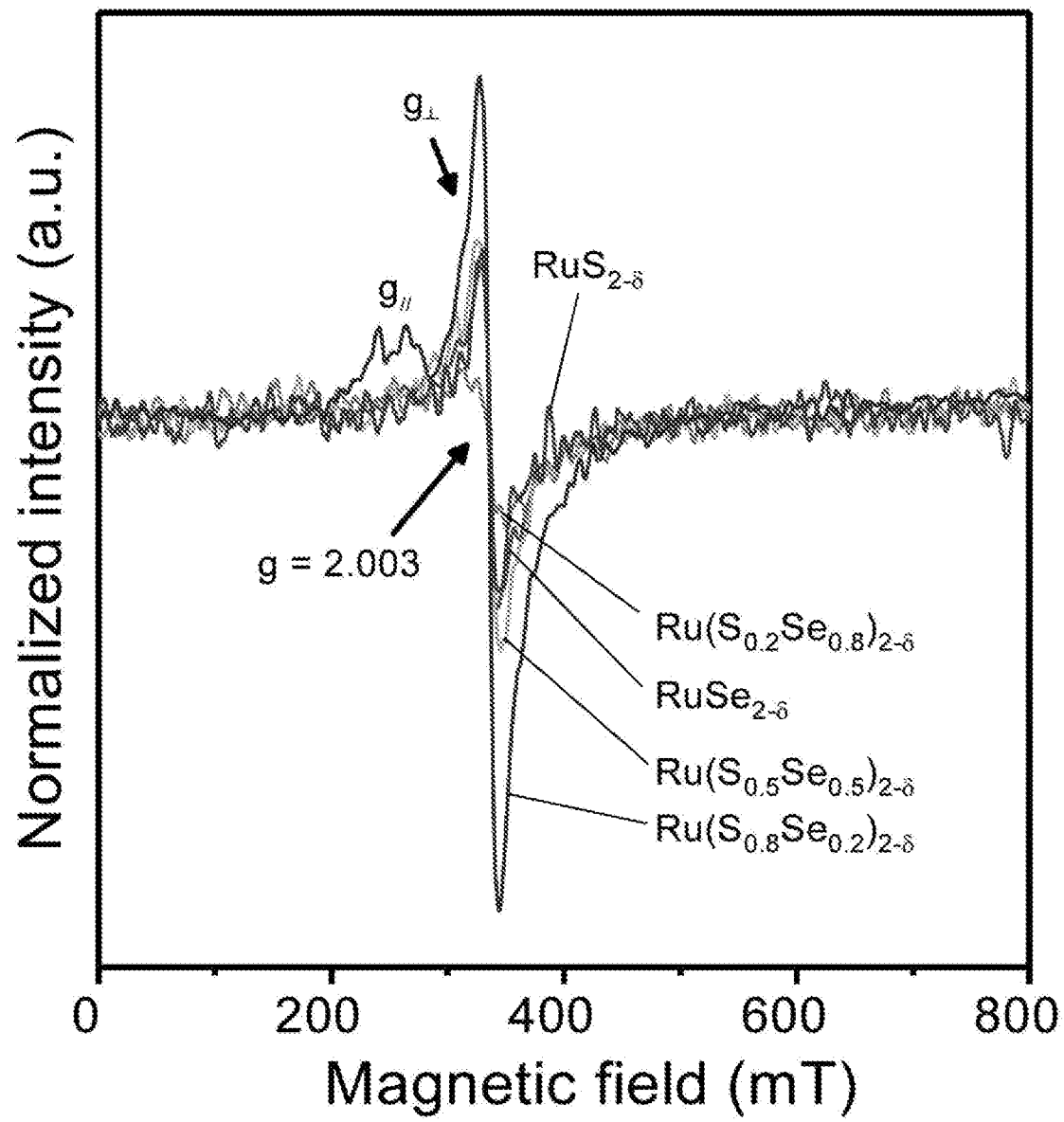
FIG. 6 shows the electron paramagnetic resonance (EPR) analysis result of catalysts for a fuel cell prepared in Examples 1-5 according to the present disclosure.

FIG. 6 shows the electron paramagnetic resonance (EPR) analysis result of the catalysts for a fuel cell prepared in Examples 1-5 according to the present disclosure. Referring to the figure, it can be seen that the peak at g=2.003, which is observed when anion vacancies are present, was observed for all of Examples 1-5, and Example 4 showed the strongest peak intensity, indicating that the most anion vacancies were formed.

Test Example 4. Analysis of Growth of Ruthenium Chalcogenide Nanotubes

In order to observe the growth of ruthenium chalcogenide nanotubes in the method for preparing a catalyst for a fuel cell of the present disclosure, some of the mixture solution was obtained while heating the mixture solution from 80° C. to 200° C., 220° C., 240° C. or 280° C. during the preparation of the catalyst for a fuel cell in Example 4 and was analyzed by transmission electron microscopy (TEM), X-ray diffraction (XRD) and X-ray photoelectron spectroscopy (XPS). The results are shown in FIGS. 7A to 7F.

Figure 7A:
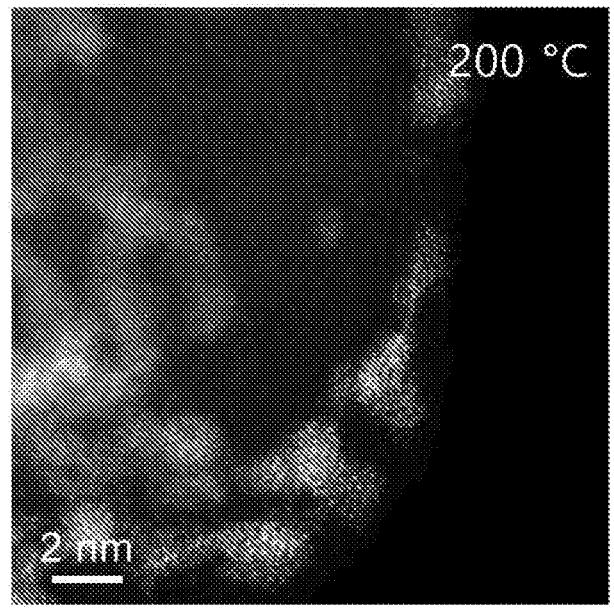
FIGS. 7A to 7F show the transmission electron microscopy (TEM) images obtained by heating a mixture solution from 80° C. to 200° C.
Figure 7B:
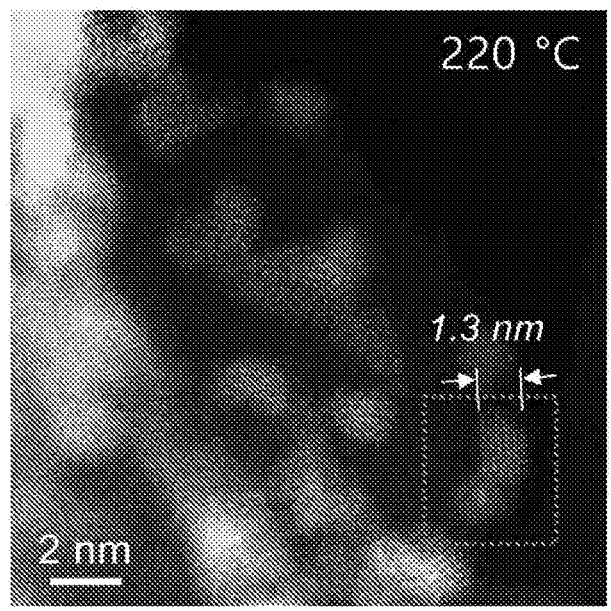
Figure 7C:
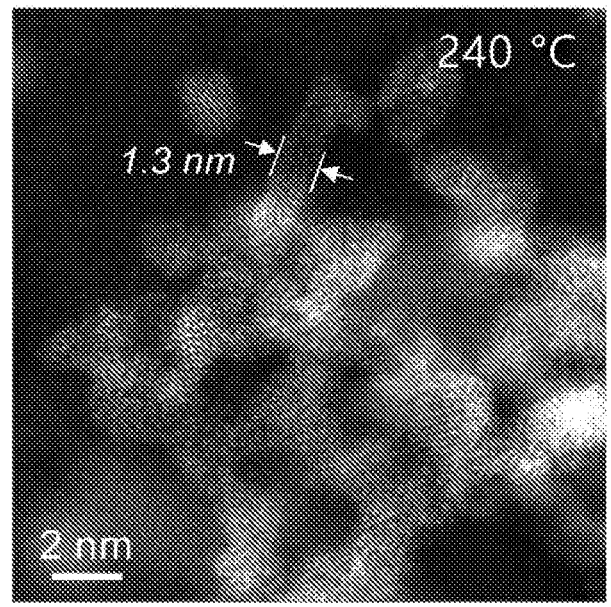
Figure 7D:
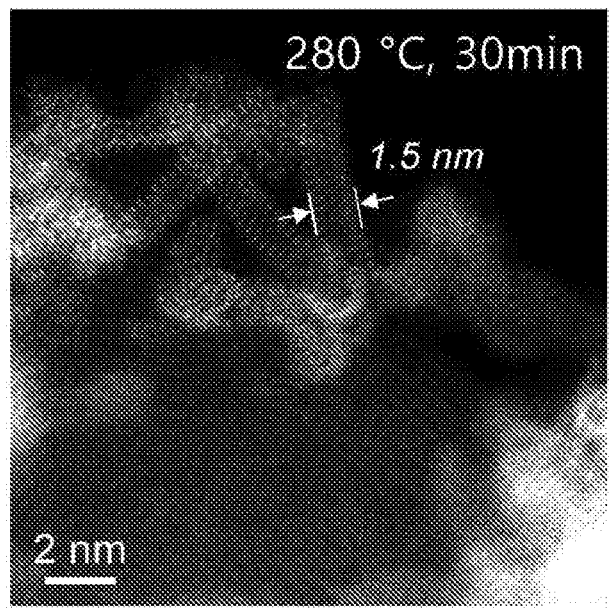
Figure 7E:
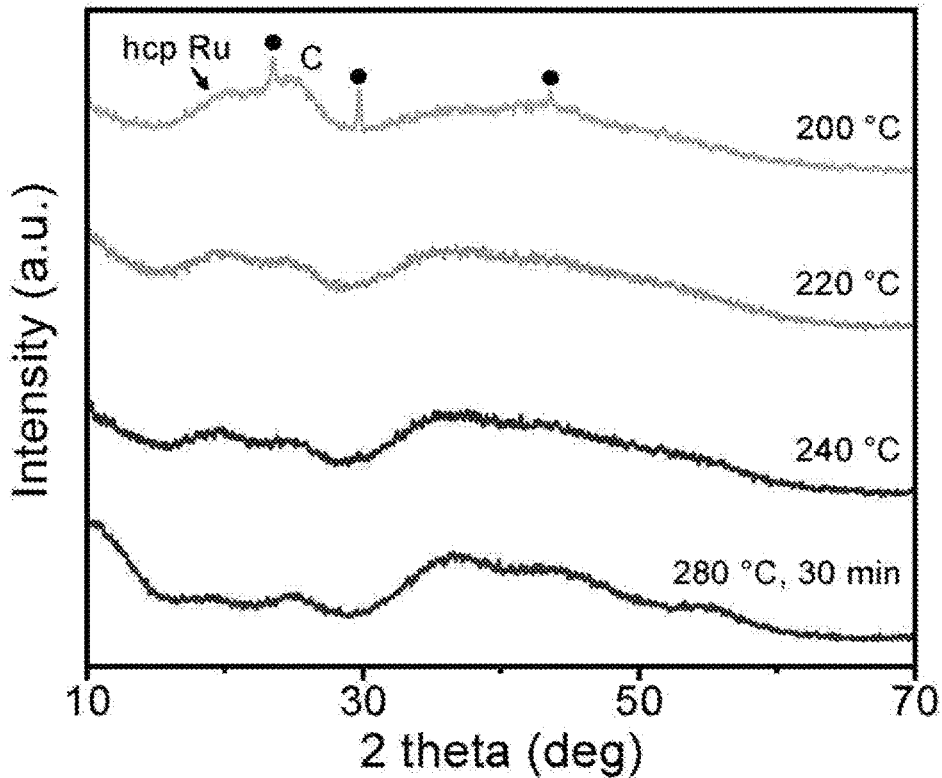
Figure 7F:
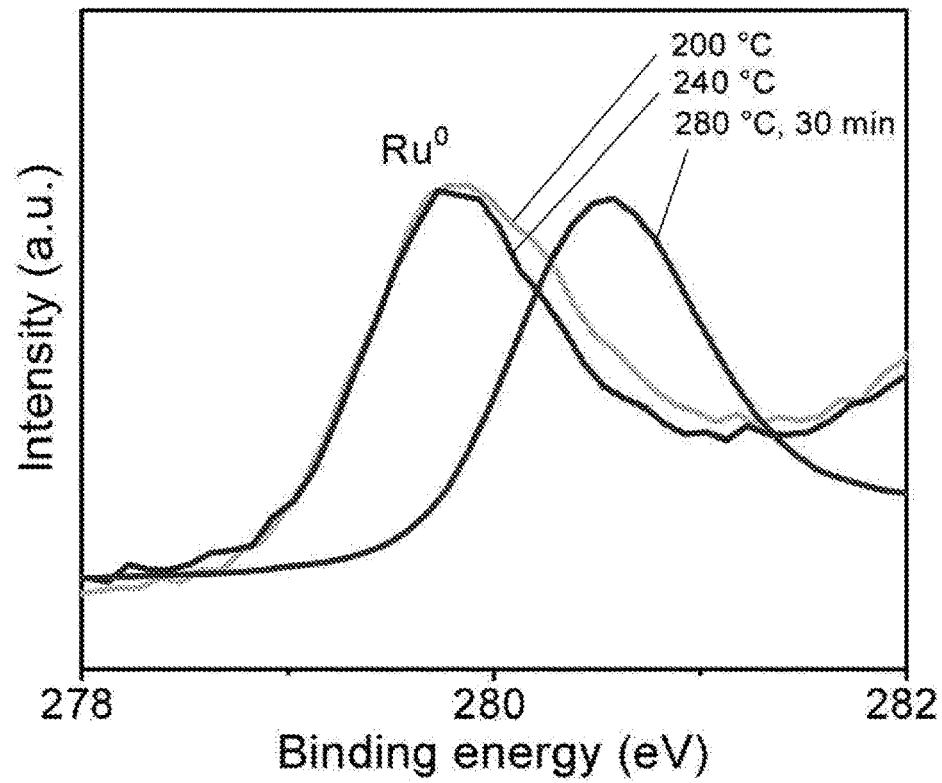

FIGS. 7A to 7F show the transmission electron microscopy (TEM) images obtained by heating a mixture solution from 80° C. to 200° C. (FIG. 7A), 220° C. (FIG. 7B), 240° C. (FIG. 7C) and 280° C. (FIG. 7D) during preparation of the catalyst for a fuel cell of Example 4 according to the present disclosure and X-ray diffraction (XRD) spectra (FIG. 7E) and X-ray photoelectron spectroscopy (XPS) spectra (FIG. 7F).

Referring to FIGS. 7A to 7D, it can be seen that amorphous particles are formed irregularly on the carbon support in the early stage of reaction, which later forms nanorods with a diameter of 1.3 nm and then are crystallized gradually into tubes having a diameter of about 1.5 nm. This process of carbon nanotube growth can also be confirmed from the XRD analysis result of FIG. 7E. In addition, referring to FIG. 7F, it can be seen that the ruthenium (Ru°) of the amorphous particles served as seed particles and all ruthenium was oxidized after the procedure was completed.

Test Example 5. Evaluation of Activity of Catalyst for a Fuel Cell

After adding 10 mg of the catalyst for a fuel cell prepared in Examples 1-5, 60 μL of a Nafion solution (5 wt %, Sigma-Aldrich), 20 μL of deionized (DI) water and 1000 μL of isopropyl alcohol to a 20-mL vial, a uniform catalyst ink was prepared through ultrasonic dispersion. The prepared catalyst ink was coated on a RDE (rotating disk electrode), twice with 5 μL each (10 μL in total), and was used as a working electrode. A platinum plate and an Ag/AgCl electrode was used as a counter and reference electrode, respectively. A half-cell test was conducted using 0.1 M KOH as an electrolyte. Electrochemical analysis of the prepared half-cell test was conducted at room temperature using the Autolab PGSTAT302N instrument, and the electrochemical characteristics were measured by rotating the RDE electrode at a speed of 1600 rpm. The results are shown in FIGS. 8A to 8D. More specifically, the oxygen reduction reaction (ORR) region (0.05 to 1.05 V vs. RHE) was scanned by linear sweep voltammetry (LSV) and cyclic voltammetry (CV) at a scan rate of 5 mV/s. The LSV measurement was made in an oxygen-saturated electrolyte and the CV measurement was made in an argon-saturated electrolyte. The hydrogen oxidation reaction (HOR) region (−0.05 to 0.7 V vs. RHE) was scanned by linear sweep voltammetry at a scan rate of 5 mV/s by using a hydrogen-saturated electrolyte. In addition, CV measurement was made in a region of 0.25-0.40 V vs. RHE for calculation of electrochemical surface area (ECSA) and Δj value was calculated at 0.33 V vs. RHE.

FIGS. 8A to 8D show linear sweep voltammetry (LSV) result showing oxygen reduction reaction (ORR) activity (FIG. 8A), cyclic voltammetry (CV) result (FIG. 8B), LSV result showing hydrogen oxidation reaction (HOR) activity (FIG. 8C) and electrochemical active surface area (ECSA) (FIG. 8D) of the catalysts in Examples 1-5 according to the present disclosure.

Figure 8A:
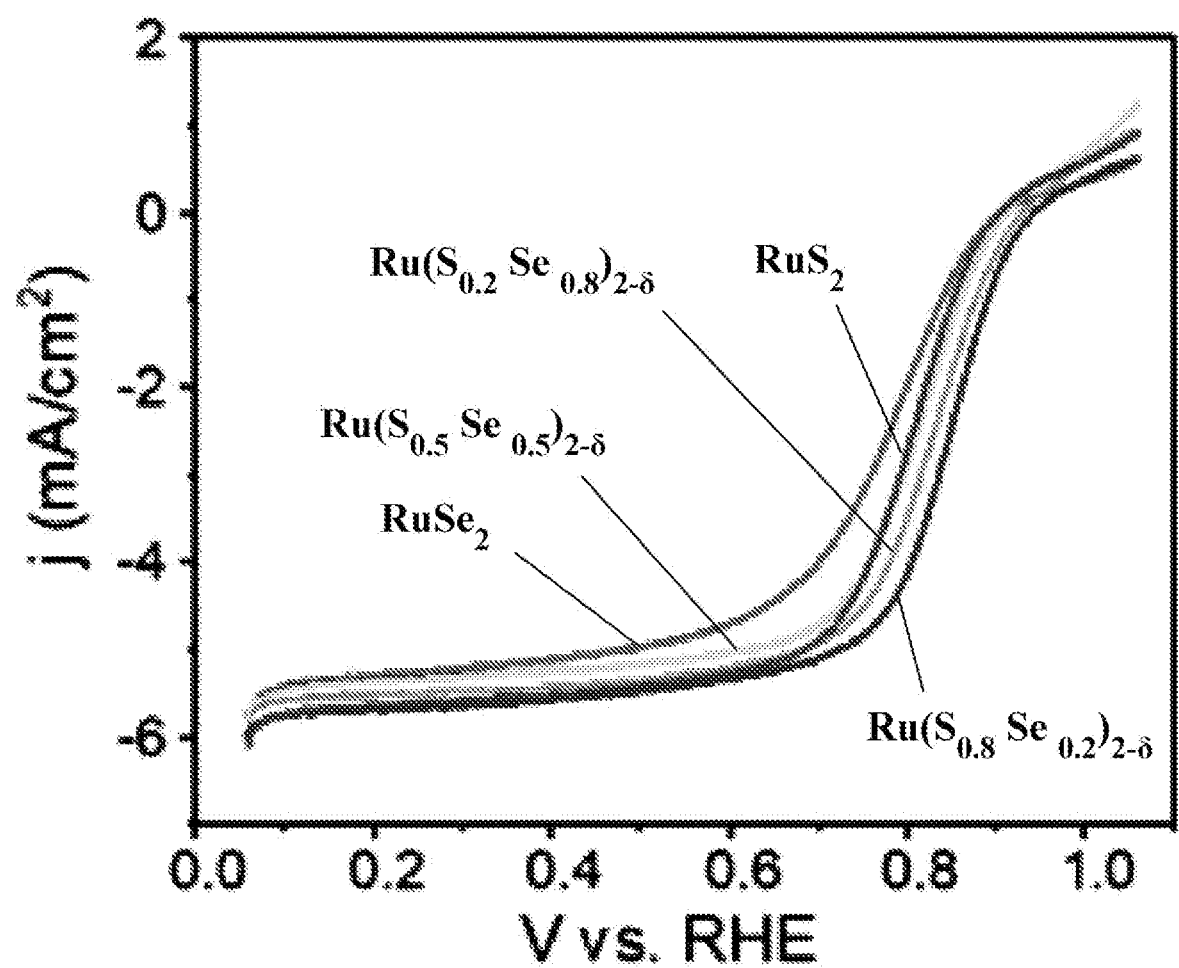
FIGS. 8A to 8D show linear sweep voltammetry (LSV) result showing oxygen reduction reaction (ORR) activity (FIG. 8A), cyclic voltammetry (CV) result (FIG. 8B), LSV result showing hydrogen oxidation reaction (HRR) activity (FIG. 8C) and electrochemical active surface area (ECSA) (FIG. 8D) of half-cells using catalysts for a fuel cell prepared in Examples 1-5 according to the present disclosure.

Referring to FIG. 8A, all the catalysts for a fuel cell of Examples 1-5 exhibited ORR activity. Difference in activity was observed depending on the composition and Example 4 exhibited the most superior ORR activity (half-wave potential $E_{1/2}$=0.86 V).

Figure 8B:
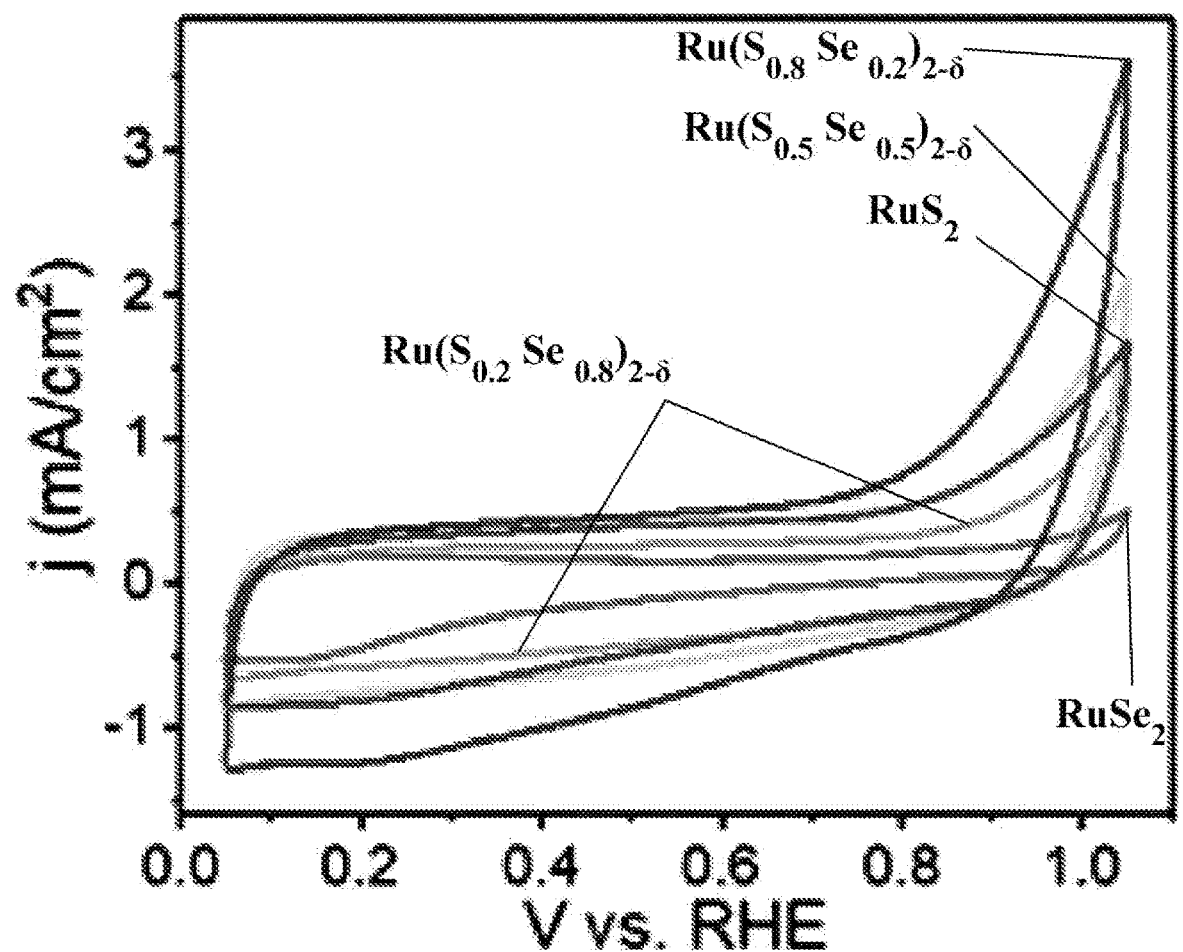

Referring to FIG. 8B, the catalysts for a fuel cell of Examples 1-5 did not show distinct oxidation-reduction peaks or hydrogen adsorption-desorption peaks. Through this, it can be seen that the catalysts were stable in the above voltage ranges.

Figure 8C:
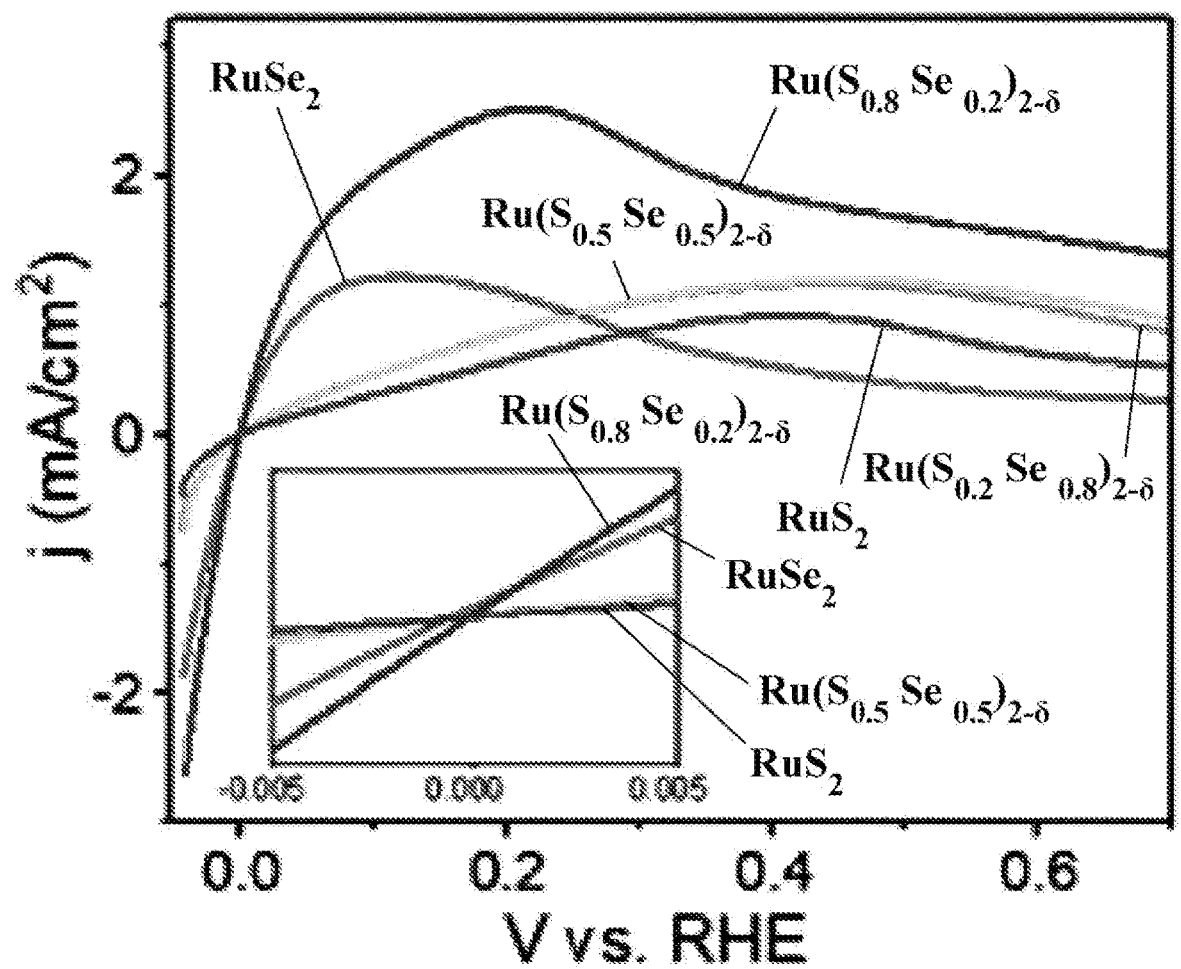

Referring to FIG. 8C, among Examples 1-5, only Example 1 and Example 4 showed high HOR activity, indicating that only Example 1 and Example 4 exhibit bi-functionality. In addition, for Example 4, the exchange current density ($j_{o,s}$) value obtained from the slope of the micropolarization region (from −0.005 to 0.005 V) was about 1.14 mA/cm$^2$. This value is superiorly comparable to that of the commercial platinum catalyst.

Figure 8D:
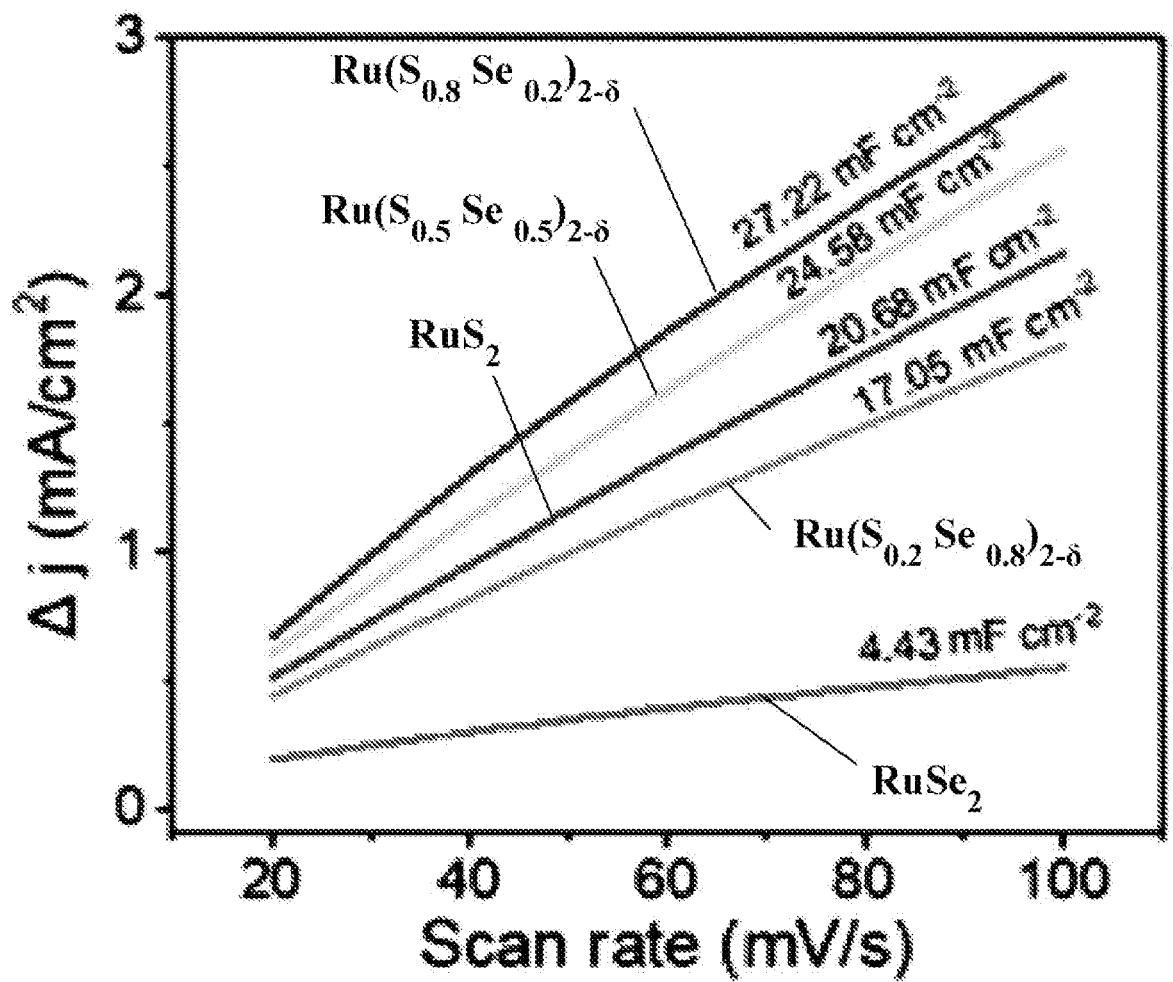

FIG. 8D shows the electrochemical active area (ECSA) values of the catalysts for a fuel cell of Examples 1-5 calculated from the difference in current density at 0.33 V (vs. RHE) depending on scan rates. Referring to the figure, it can be seen that the catalysts for a fuel cell of Examples 1-5 have large active areas.

Test Example 6. Accelerated Degradation Testing

Figure 9A:
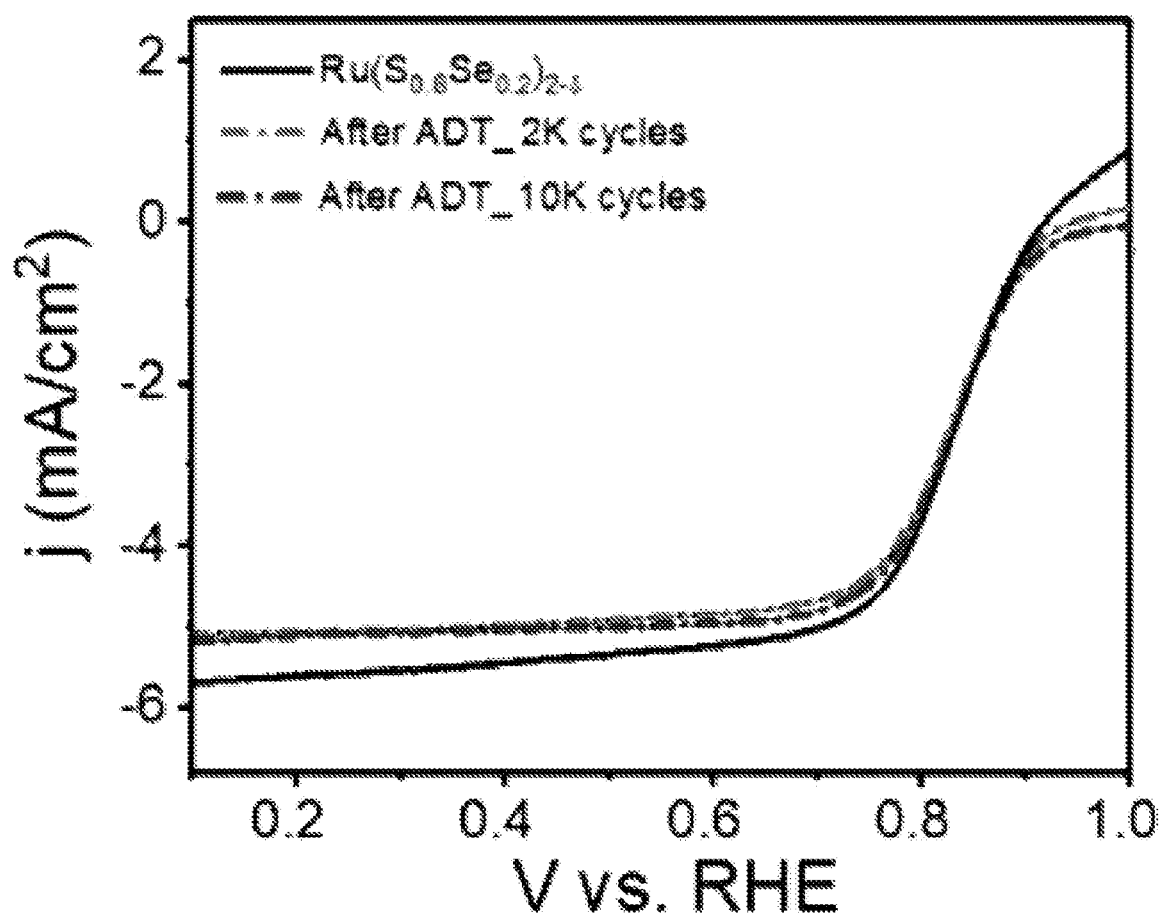
FIGS. 9A to 9C show linear sweep voltammetry (LSV) result (FIG. 9A), cyclic voltammetry (CV) result (FIG. 9B), specific activity and mass activity (FIG. 9C) of a half-cell using a catalyst for a fuel cell prepared in Example 4 according to the present disclosure before and after accelerated degradation testing.
Figure 9B:
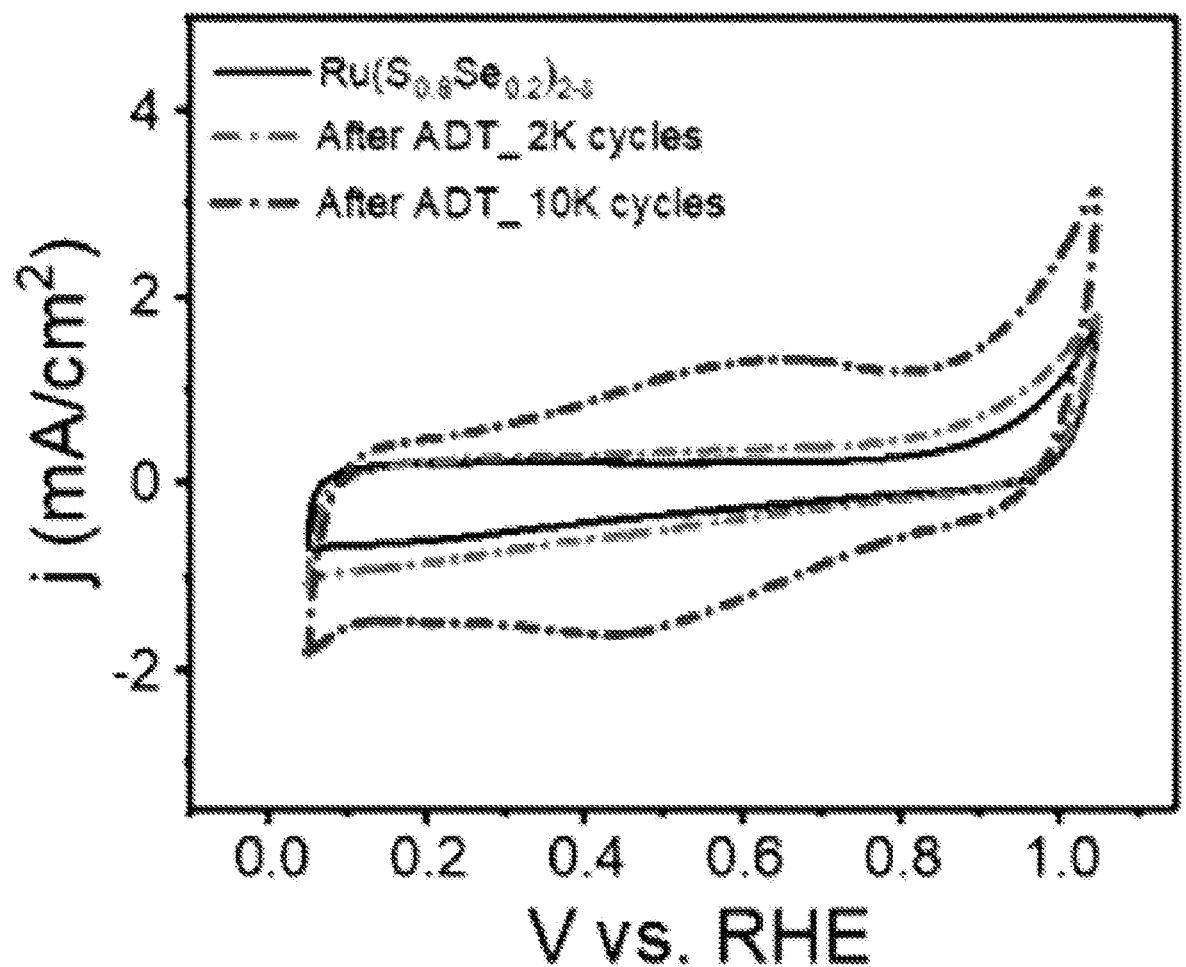
Figure 9C:
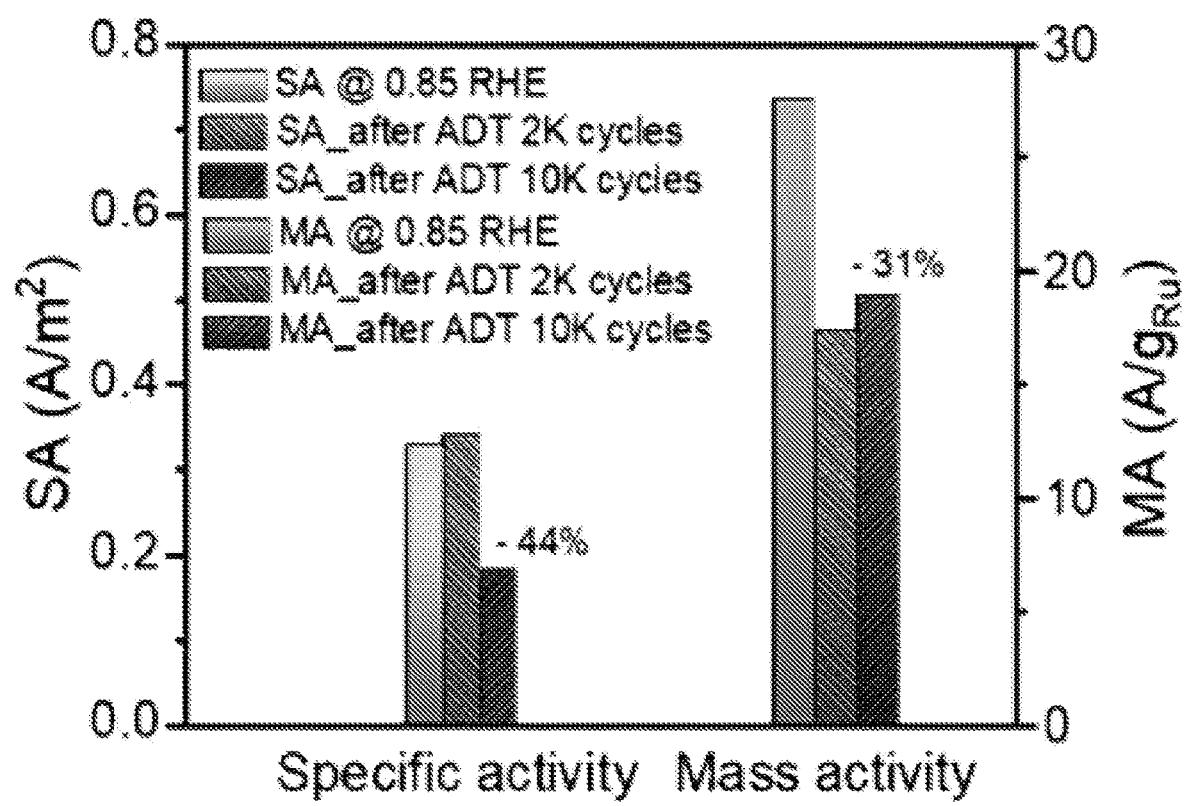

Accelerated degradation testing was performed for the half-cells prepared in Test Example 4 using the catalysts for a fuel cell prepared in Examples 1-5 in a region of 0.6 to 1.0 V vs. RHE at a scan rate of 100 mV/s for 10,000 cycles. The results are shown in FIGS. 9A to 9C. The scanning transmission electron microscopy images of the catalyst for a fuel cell before and after the accelerated degradation testing are shown in FIGS. 10A and 10B.

FIGS. 9A to 9C show linear sweep voltammetry (LSV) result (FIG. 9A), cyclic voltammetry (CV) result (FIG. 9B), specific activity and mass activity (FIG. 9C) of the half-cell using the catalyst for a fuel cell prepared in Example 4 according to the present disclosure before and after accelerated degradation testing. In FIGS. 9A to 9C, the solid line indicates initial catalytic activity, and the dotted line indicates the catalytic activity after 2,000 cycles or 10,000 cycles.

Referring to FIGS. 9A to 9C, although the half-wave potential was hardly changed before and after the accelerated degradation testing, the CV was broadened as the cycle number was increased, which may be due to the oxidation of ruthenium and surface change of the electrode. The catalyst for a fuel cell of the present disclosure showed little change in the half-wave potential, indicating that it can exhibit high stability by solving the problem of the existing ruthenium-based catalyst such as metal dissolution.

Figure 10A:
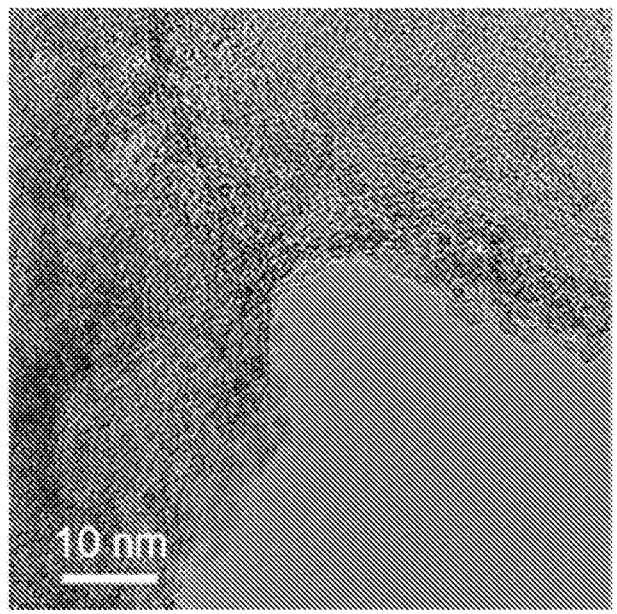
FIGS. 10A and 10B show the transmission electron microscopy (TEM) images of a half-cell using a catalyst for a fuel cell prepared in Example 4 according to the present disclosure before accelerated degradation testing (FIG. 10A) and after accelerated degradation testing for 10000 cycles (FIG. 10B).
Figure 10B:
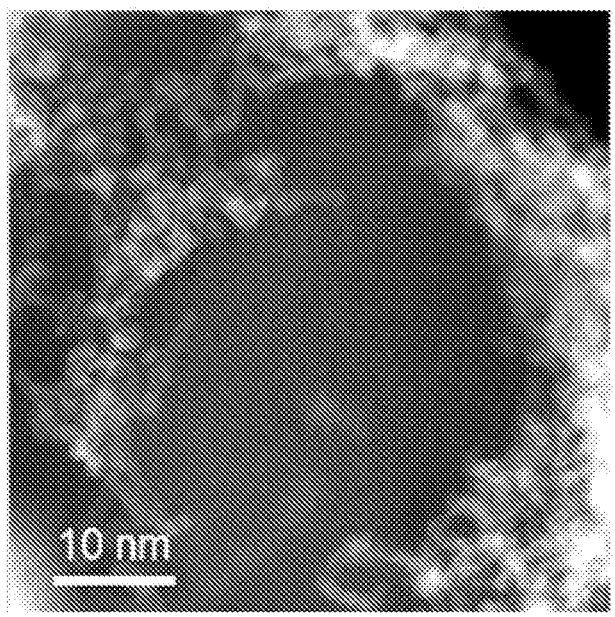

FIGS. 10A and 10B show the transmission electron microscopy (TEM) images of the half-cell using the catalyst for a fuel cell prepared in Example 4 according to the present disclosure before accelerated degradation testing (FIG. 10A) and after accelerated degradation testing for 10000 cycles (FIG. 10B). Referring to the figure, it can be seen that the catalyst for a fuel cell of the present disclosure has superior durability since the morphology of the ruthenium chalcogenide nanotubes was maintained after the accelerated degradation testing.

Figure 11:
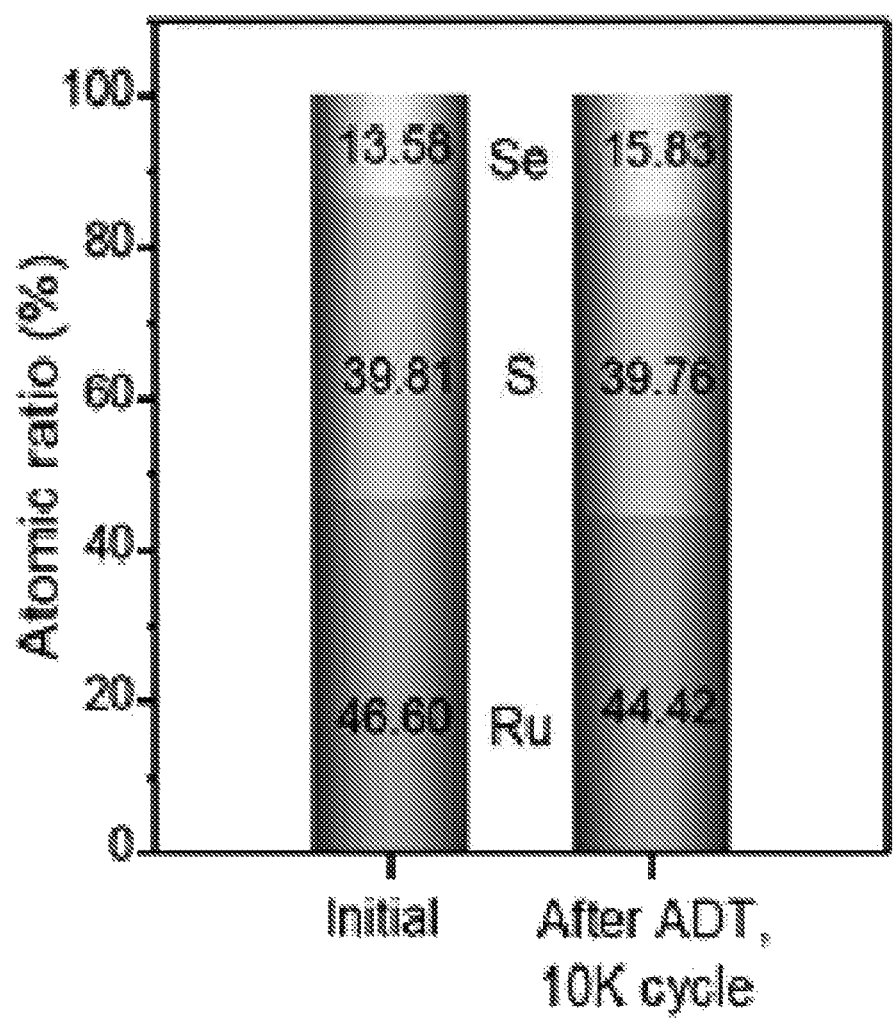
FIG. 11 shows the energy-dispersive spectroscopy (EDS) result of a half-cell using a catalyst for a fuel cell prepared in Example 4 according to the present disclosure before and after accelerated degradation testing for 10000 cycles.

FIG. 11 shows the energy-dispersive spectroscopy (EDS) result of the half-cell using the catalyst for a fuel cell prepared in Example 4 according to the present disclosure before and after accelerated degradation testing for 10000 cycles. Referring to the figure, it can be seen that the composition of Example 4 was maintained constant even after the accelerated degradation testing, indicating that ruthenium remains stably without loss during the electrochemical reaction.

Figure 12A:
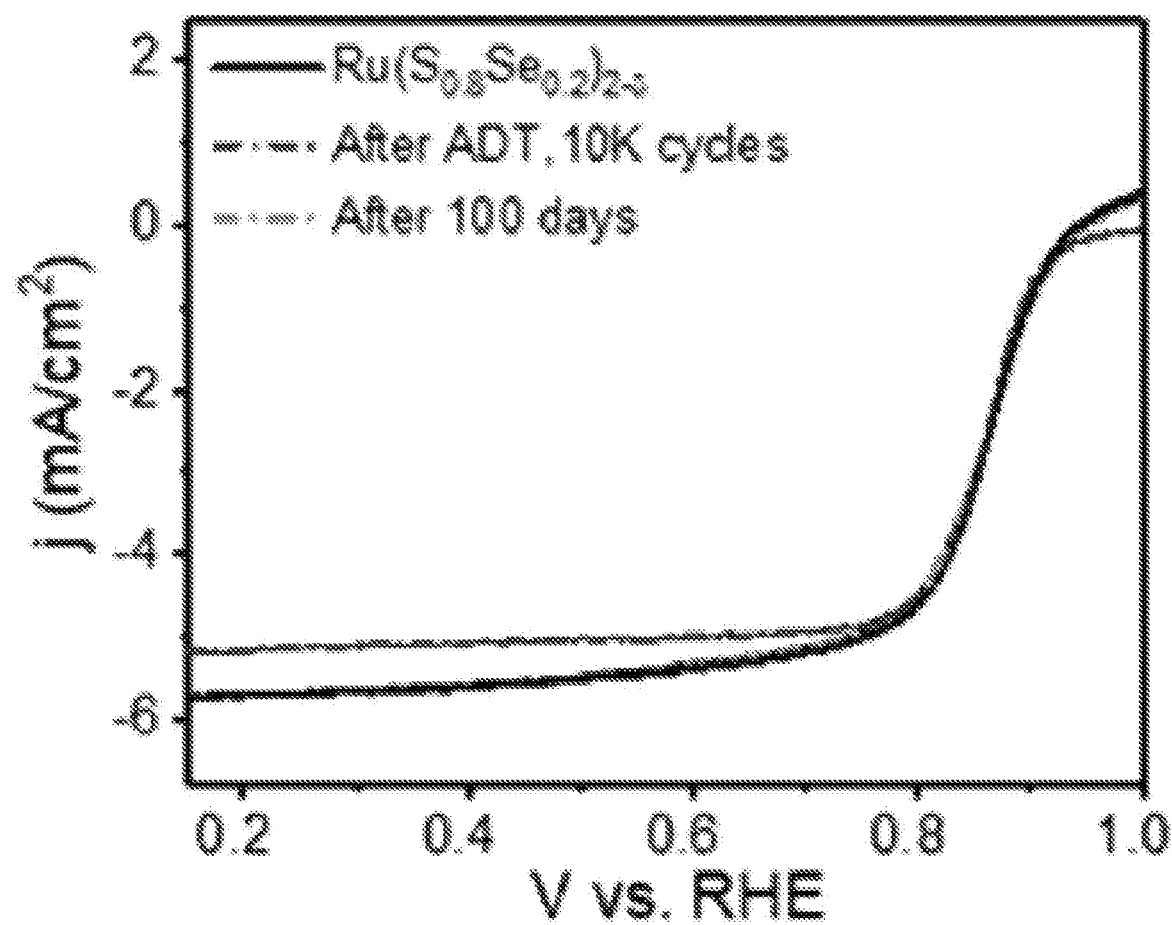
FIGS. 12A to 12C show the accelerated degradation testing result of half-cells using catalysts for a fuel cell prepared in Example 4 (FIG. 12A) and Comparative Example 1 (FIG. 12B) and catalytic mass activity before and after accelerated degradation testing and 100 days later (FIG. 12C).
Figure 12B:
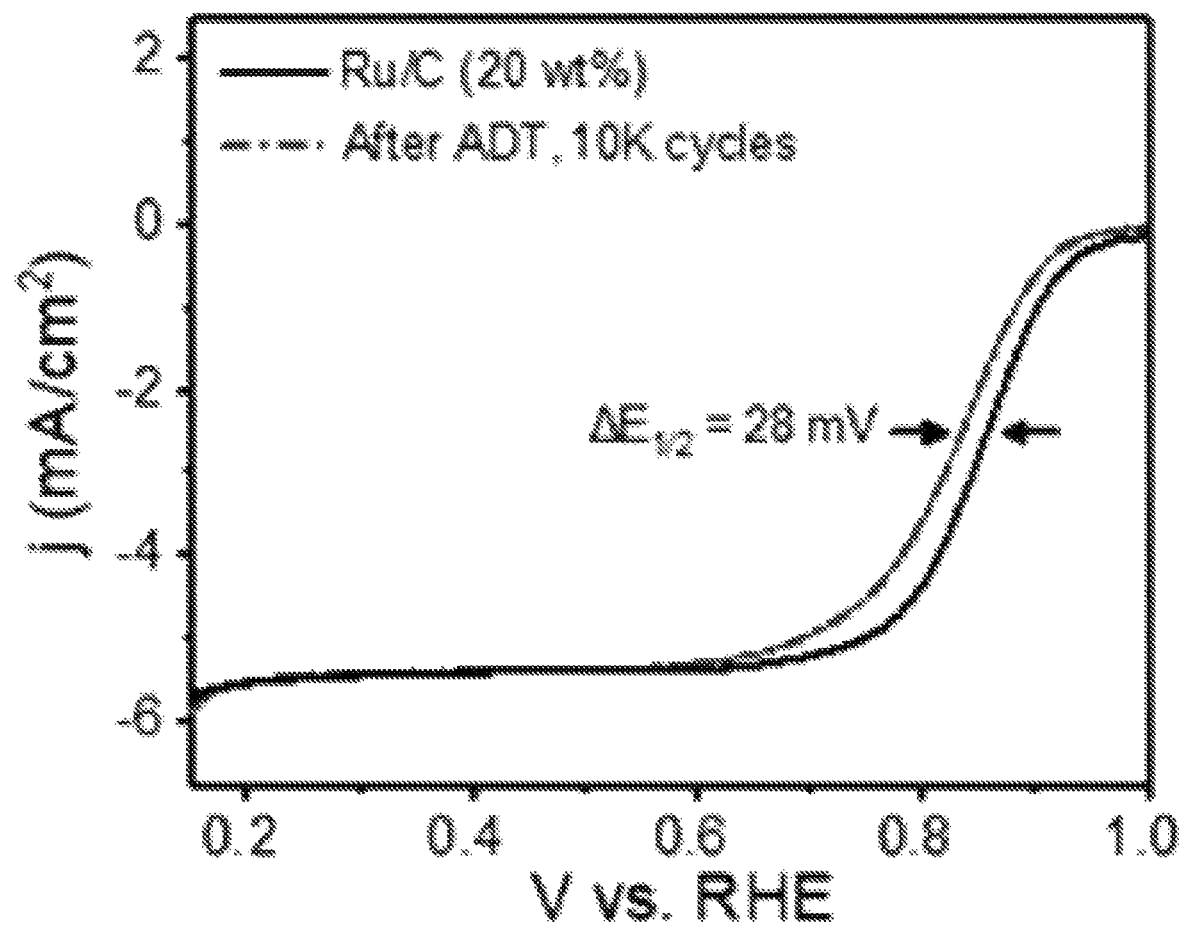
Figure 12C:
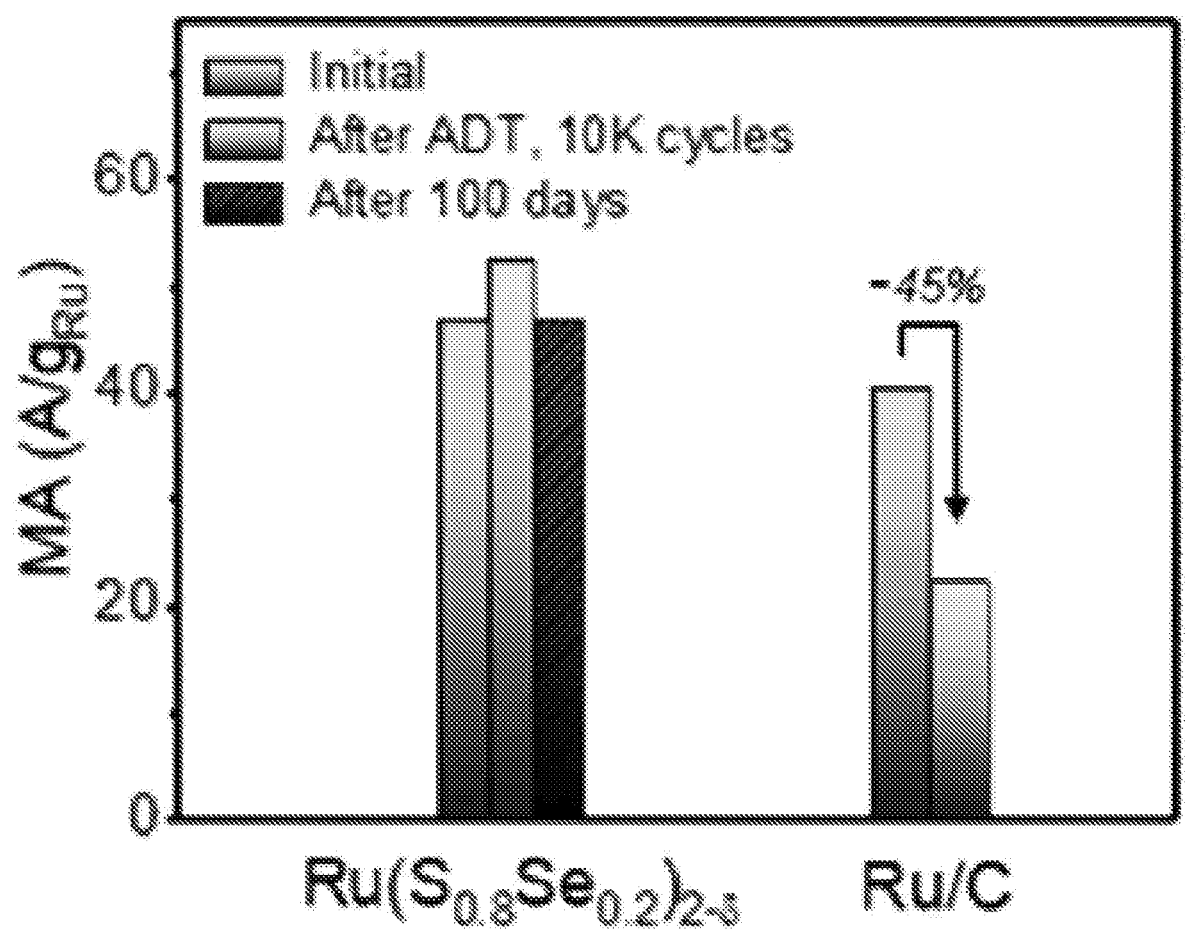

FIGS. 12A to 12C show the accelerated degradation testing result of the half-cells using the catalysts for a fuel cell prepared in Example 4 (FIG. 12A) and Comparative Example 1 (FIG. 12B) and catalytic mass activity before and after accelerated degradation testing and 100 days later (FIG. 12C). Referring to FIGS. 12A to 12C, it can be seen that Example 4 maintained the catalytic performance after 10,000 cycles of accelerated degradation testing whereas the catalytic mass activity of Comparative Example 1 was decreased by 45%. In addition, Example 4 maintained the catalytic performance even after 100 days, indicating that the Example 4 has stability against long term air exposure, unlike other metastable phases.

What is claimed is:

1. A catalyst for a fuel cell, comprising:
    a carbon support; and
    ruthenium chalcogenide single-walled nanotubes distributed on the carbon support, wherein
    the ruthenium chalcogenide comprises 1T phase, and
    the chalcogen of the ruthenium chalcogenide is sulfur, selenium or a combination thereof.

2. The catalyst for a fuel cell according to claim 1, wherein the ruthenium chalcogenide comprises anion vacancies.

3. The catalyst for a fuel cell according to claim 1, wherein the ruthenium chalcogenide nanotubes have an average diameter of 1.4-1.6 nm.

4. The catalyst for a fuel cell according to claim 1, wherein the ruthenium chalcogenide exhibits a peak at 0-2 eV as a result of X-ray photoelectron spectroscopy (XPS) analysis.

5. The catalyst for a fuel cell according to claim 1, wherein, as a result of S 2p and Se 3d X-ray photoelectron spectroscopy (XPS) analysis, the ruthenium chalcogenide exhibits a ratio of the area of a peak at 163.5-164.2 eV to the area of a peak at 162.4-163.5 eV of 0.5-2.5.

6. The catalyst for a fuel cell according to claim 1, wherein, as a result of Se 3d X-ray photoelectron spectroscopy (XPS) analysis, the ruthenium chalcogenide exhibits a ratio of the area of a peak at 55.7-56.9 eV to the area of a peak at 54.4-55.2 eV of 2.5-10.

7. The catalyst for a fuel cell according to claim 1, wherein the chalcogen is a mixture of sulfur and selenium, and the sulfur is comprised in an amount of 0.65-0.85 mol %.

8. The catalyst for a fuel cell according to claim 1, wherein the ruthenium chalcogenide exhibits a peak at g=2.003 in electron paramagnetic resonance (EPR)spectrum.

9. The catalyst for a fuel cell according to claim 1, wherein the ruthenium chalcogenide exhibits a chalcogen-to-ruthenium ratio (chalcogen/ruthenium) of lower than 2 as a result of elemental composition analysis by energy-dispersive spectroscopy (EDS).

10. The catalyst for a fuel cell according to claim 1, wherein the ruthenium chalcogenide nanotubes exhibit the strongest intensity for a peak corresponding to the (002) plane as compared to the peaks corresponding to the (110), (103) and (105) planes as a result of XRD analysis.

11. The catalyst for a fuel cell according to claim 1, wherein the carbon support is one or more selected from a group consisting of Vulcan, graphite carbon, acetylene black, Ketjen black, carbon nanotube, carbon nanowire and carbon nanorod.

12. A fuel cell comprising the catalyst for a fuel cell according to claim 1.

* * * * *